United States Patent
Maderic

(10) Patent No.: US 11,287,124 B2
(45) Date of Patent: Mar. 29, 2022

(54) SMART DEVICE CONTROLLABLE LED-BASED COLOR CHANGING APPAREL AND DEVICES

(71) Applicant: JMad Creations, LLC, Bethlehem, PA (US)

(72) Inventor: Jonathan M. Maderic, Bethlehem, PA (US)

(73) Assignee: JMAD CREATIONS, LLC, Bethlehem, PA (US)

( * ) Notice: Subject to any disclaimer, the term of this patent is extended or adjusted under 35 U.S.C. 154(b) by 0 days.

(21) Appl. No.: 16/898,783

(22) Filed: Jun. 11, 2020

(65) Prior Publication Data
US 2021/0388979 A1    Dec. 16, 2021

(51) Int. Cl.
| | |
|---|---|
| *F21V 33/00* | (2006.01) |
| *A41D 27/08* | (2006.01) |
| *H04W 4/80* | (2018.01) |
| *H05B 47/19* | (2020.01) |
| *H05B 45/20* | (2020.01) |
| *A41D 1/00* | (2018.01) |

(52) U.S. Cl.
CPC .......... *F21V 33/0008* (2013.01); *A41D 1/002* (2013.01); *A41D 27/085* (2013.01); *H04W 4/80* (2018.02); *H05B 45/20* (2020.01); *H05B 47/19* (2020.01)

(58) Field of Classification Search
CPC ............ F21V 33/0008; F21V 33/0004; F21V 33/008; A41D 27/085; A41D 1/002; H05B 45/20; H05B 47/19; H04W 4/80; A43B 3/001
See application file for complete search history.

(56) References Cited

U.S. PATENT DOCUMENTS

| | | | | |
|---|---|---|---|---|
| 10,455,887 | B2* | 10/2019 | London | A43B 5/00 |
| 10,482,726 | B2* | 11/2019 | Grom | H04W 4/023 |
| 10,813,196 | B1* | 10/2020 | Stubbs | F21V 23/0471 |
| 10,816,939 | B1* | 10/2020 | Coleman | G05B 1/00 |
| 2017/0238392 | A1* | 8/2017 | Shearer | H05B 45/10 315/153 |
| 2017/0303646 | A1* | 10/2017 | Bricken | H04R 1/028 |
| 2017/0314775 | A1* | 11/2017 | Goodrich | A43B 3/001 |
| 2019/0082756 | A1* | 3/2019 | Arno | A43B 3/0078 |
| 2019/0223275 | A1* | 7/2019 | Chen | F21L 4/02 |

\* cited by examiner

*Primary Examiner* — Peggy A Neils
(74) *Attorney, Agent, or Firm* — J.A. Lindeman & Co. PLLC

(57) ABSTRACT

Color changing systems include a color changing article or device that includes a color, text, and pattern changing hardware. Smart devices or other standalone controllers provide software instructions to the color changing hardware to produce colors, patterns, and text which appear on the articles or devices. A software app running on the smart device or standalone controller initiates a method of changing colors, text, and patterns of apparel, devices, hard goods, and accessories. The color changing systems include fabrics and other materials including LEDs, LED fiber optic fabrics, electroluminescence (EL), bioluminescence, electrochromatics, E-ink, OLED, light guides, printed nano LEDs, photonic ink, and other materials. The systems selectively apply an analog voltage or data stream to the output material to produce an article with a selected color, text or pattern. A camera or color detector can be used to select colors for display.

18 Claims, 25 Drawing Sheets
(6 of 25 Drawing Sheet(s) Filed in Color)

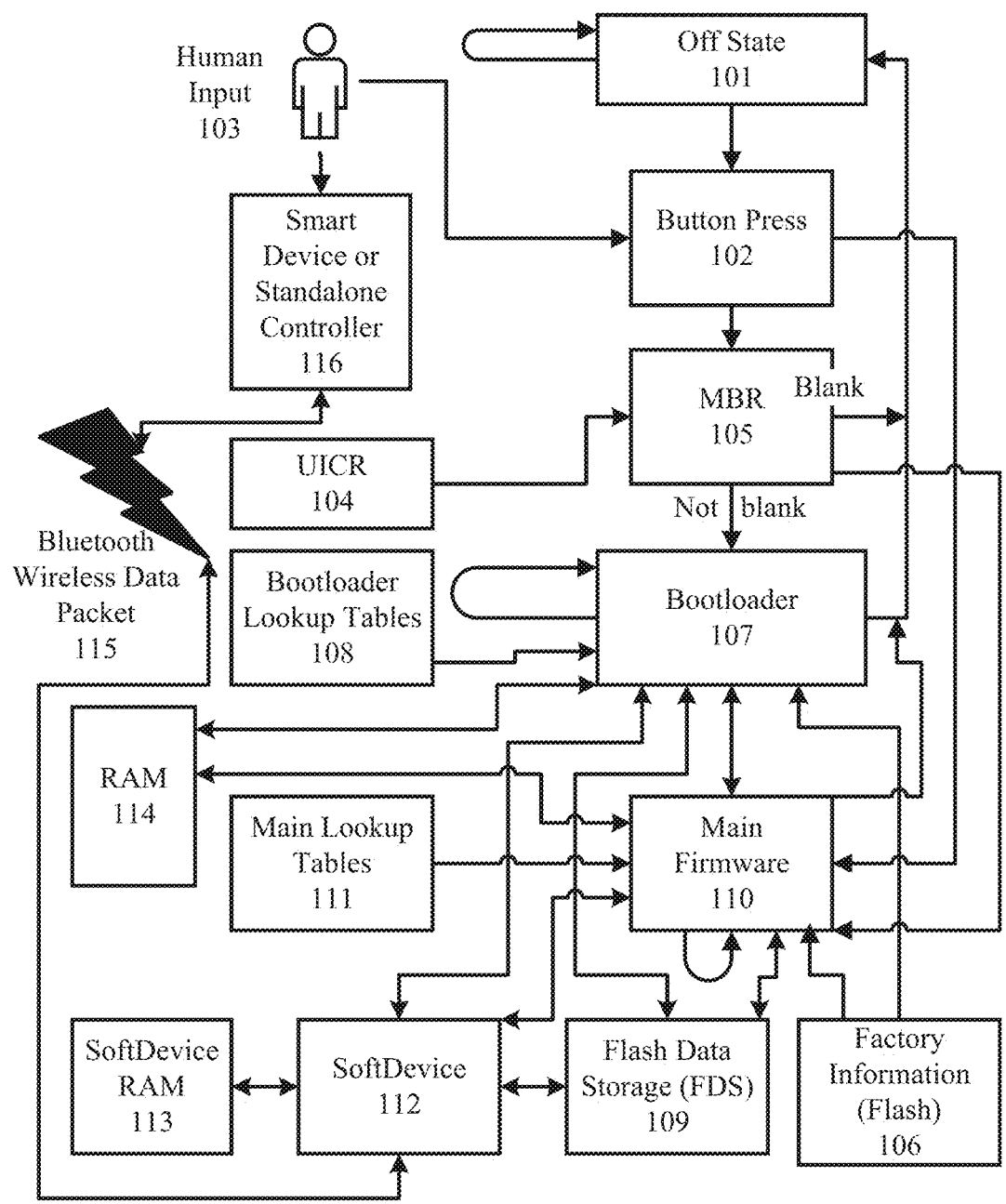
Firmware Overview (FIG. 1)

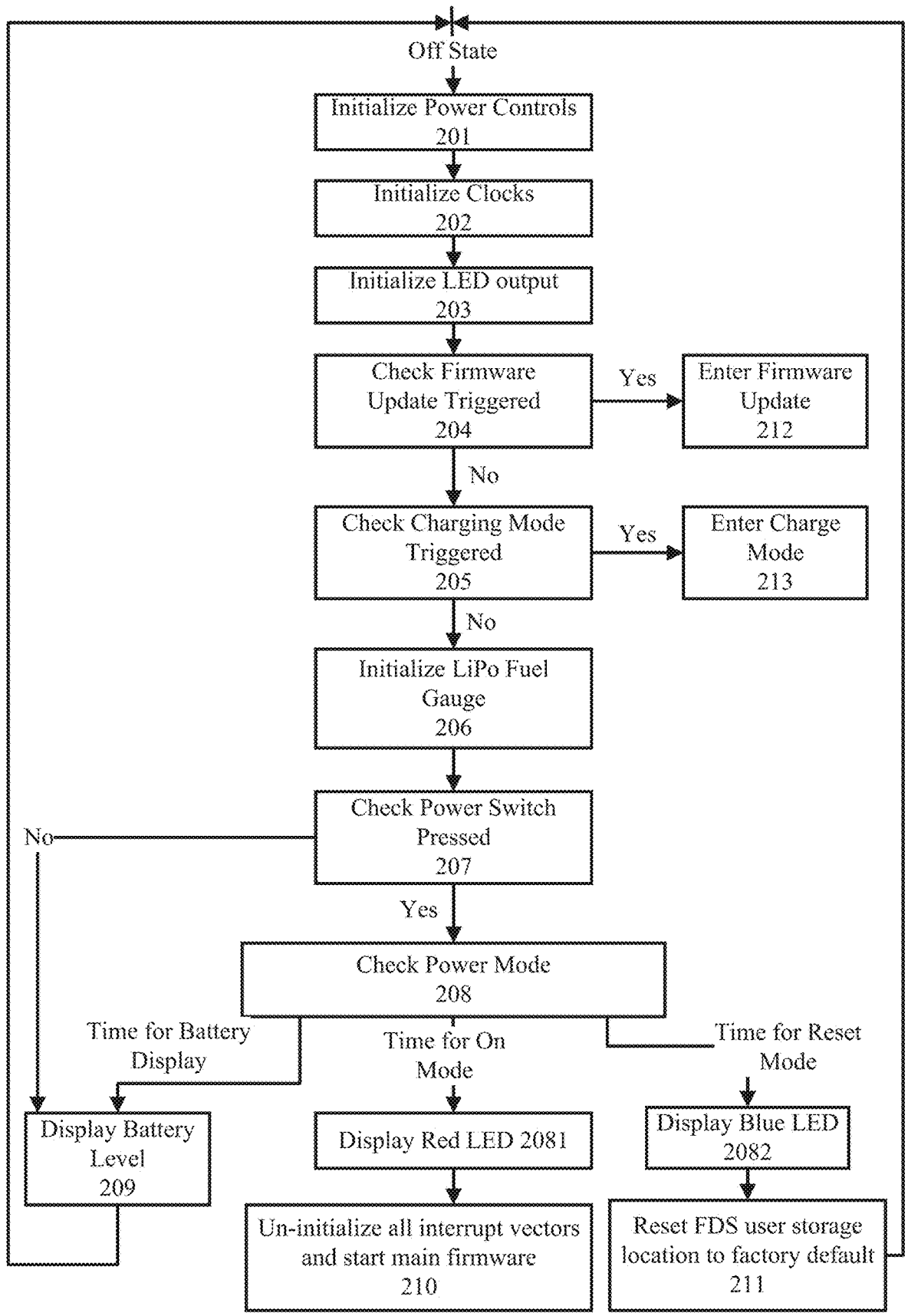

Firmware Main FIG. 3
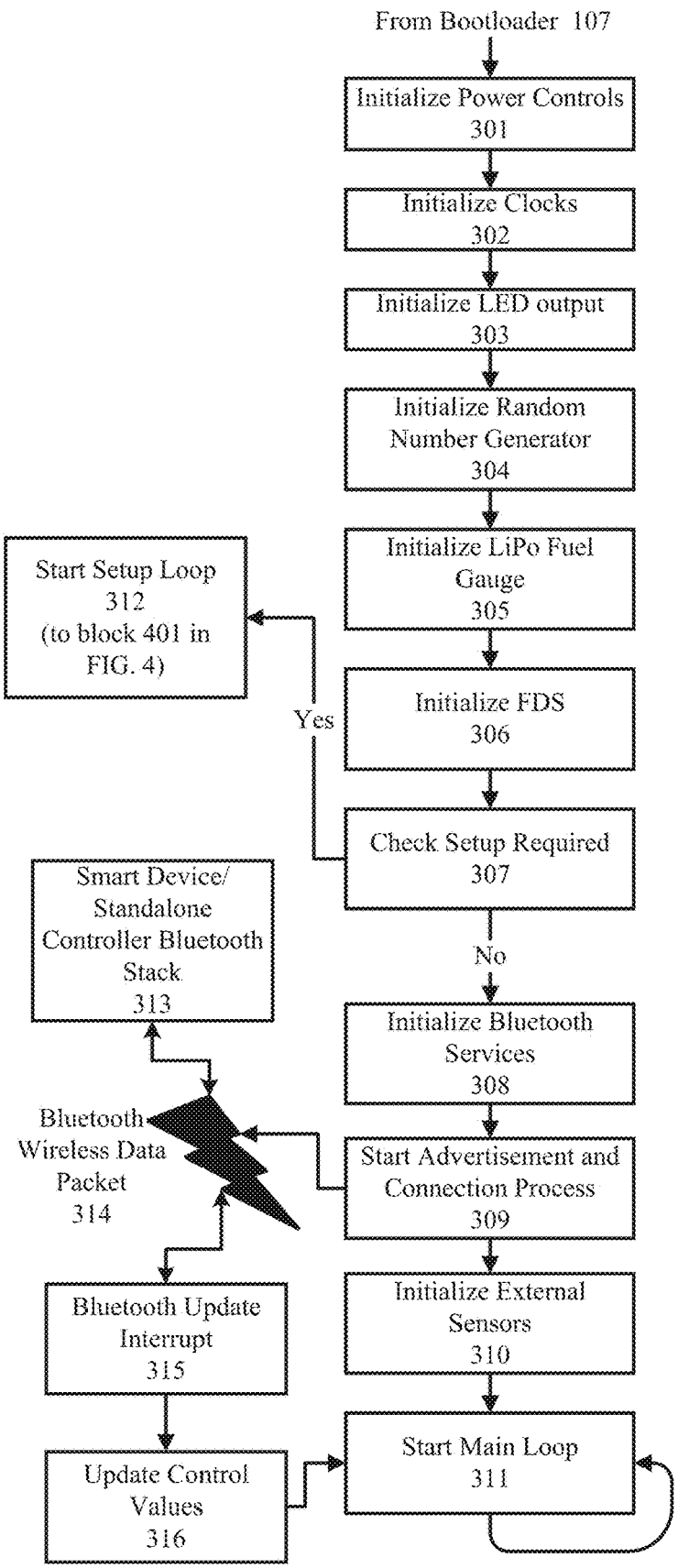

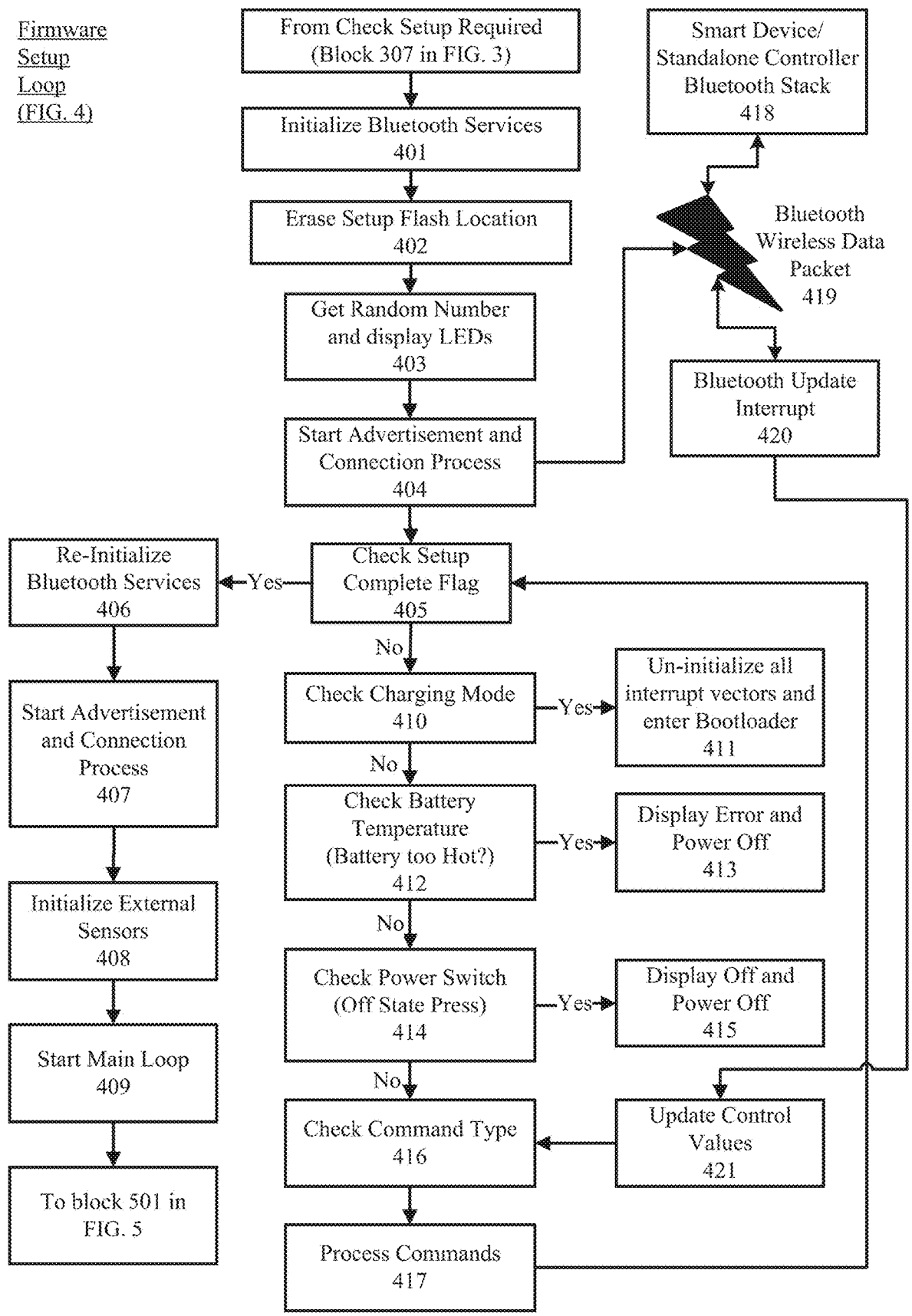

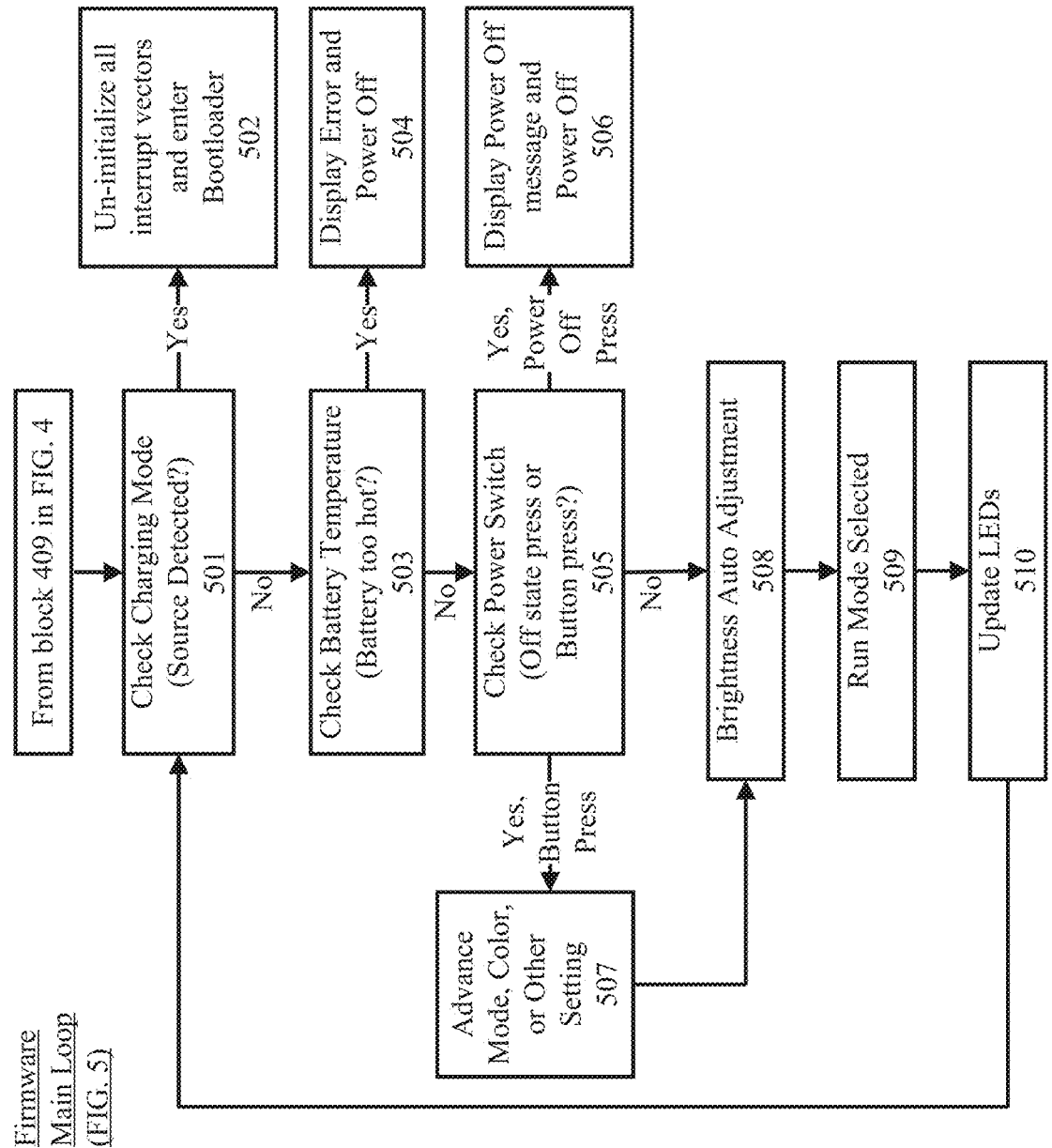

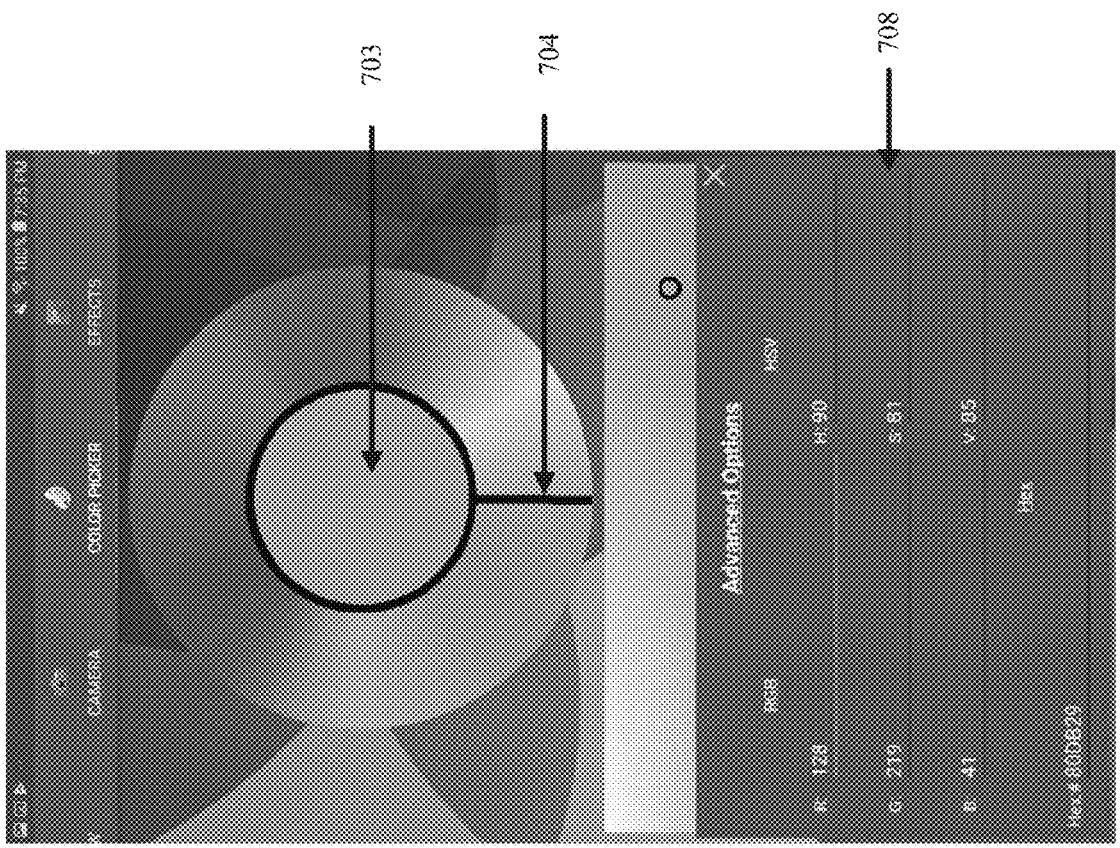
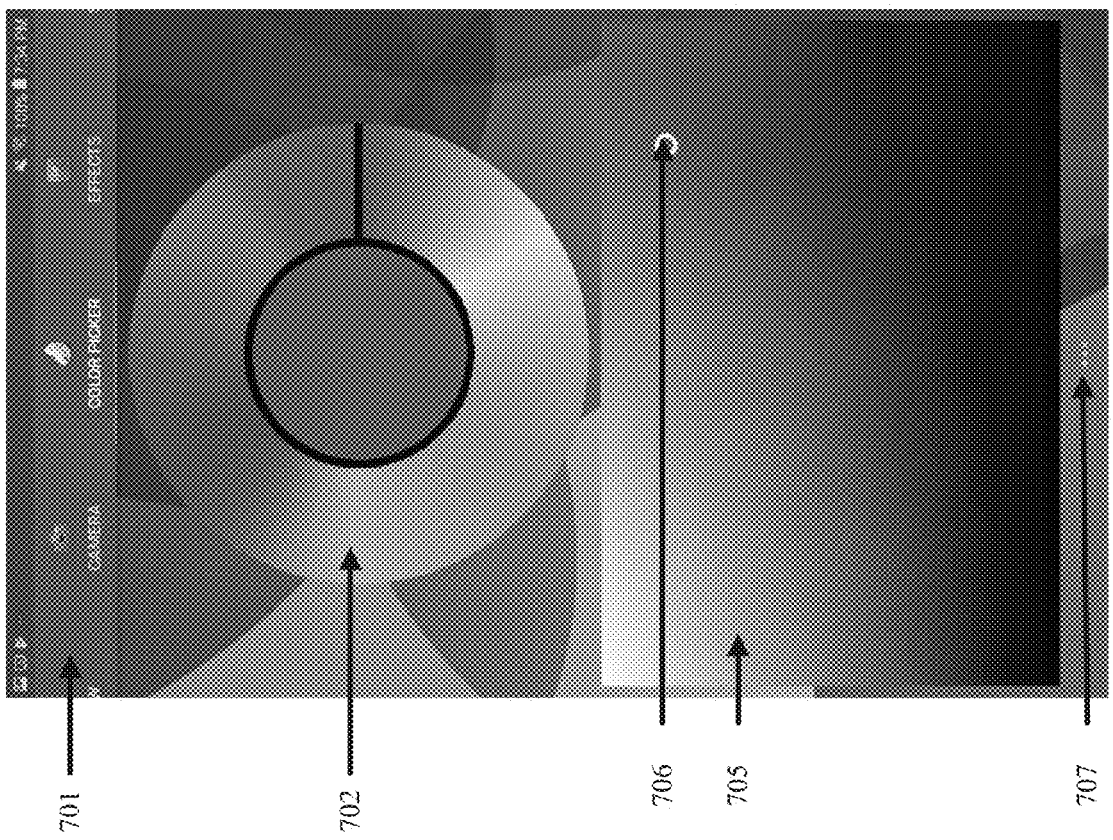

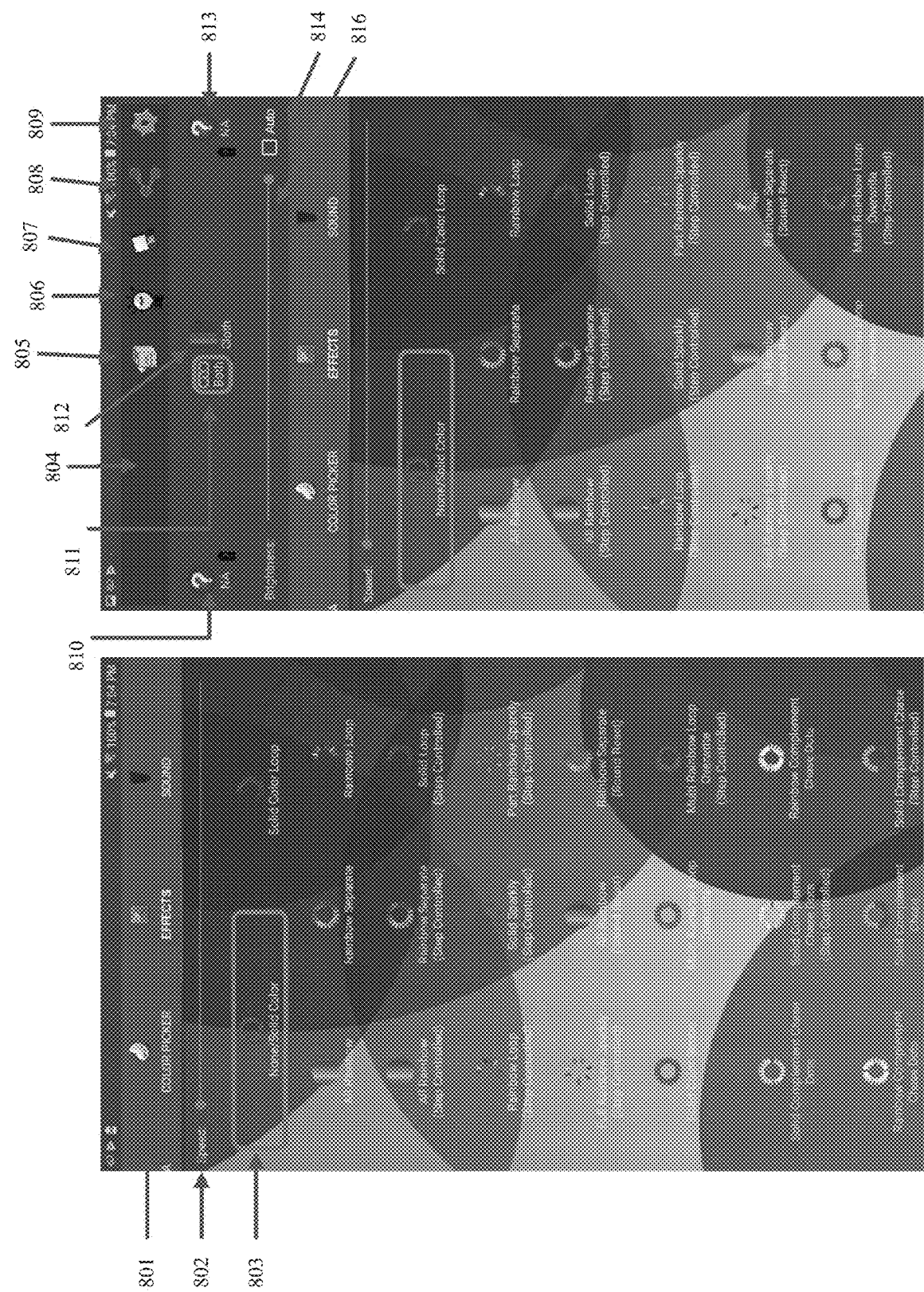

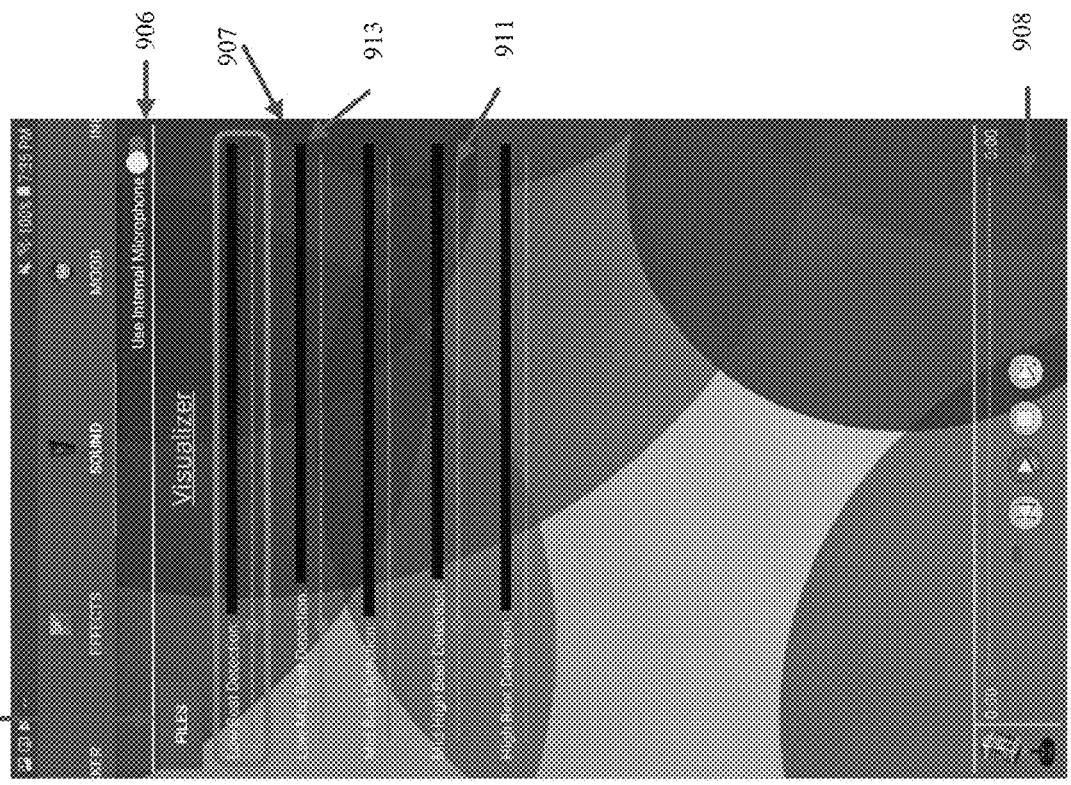
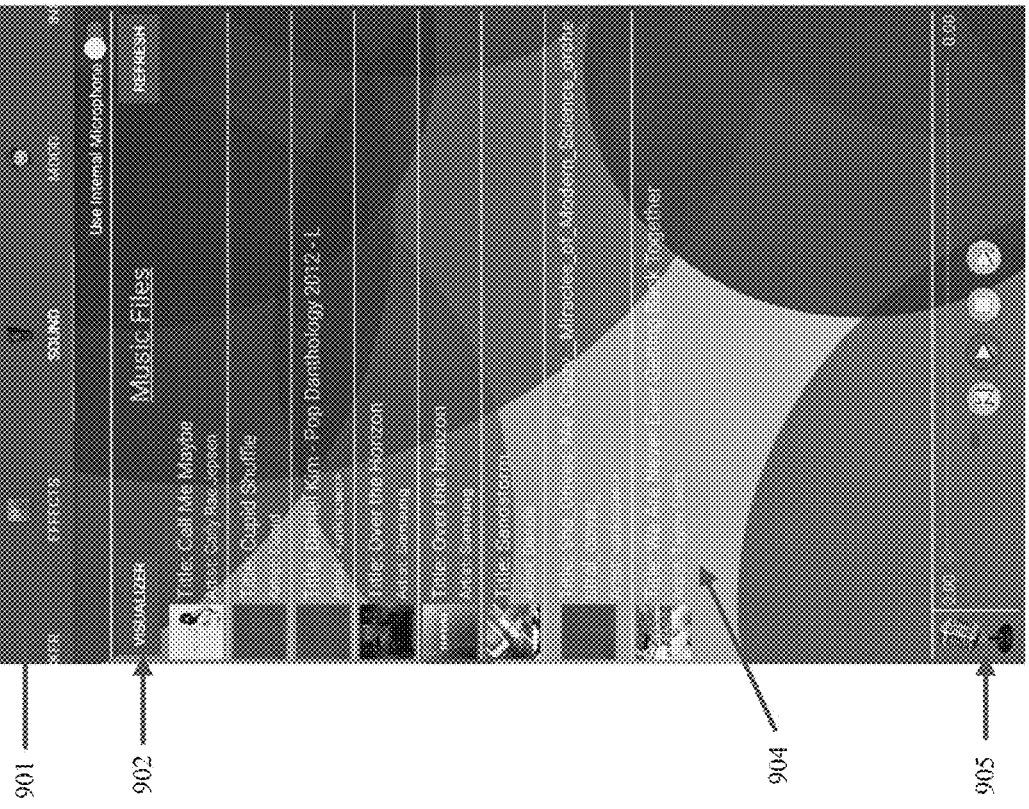

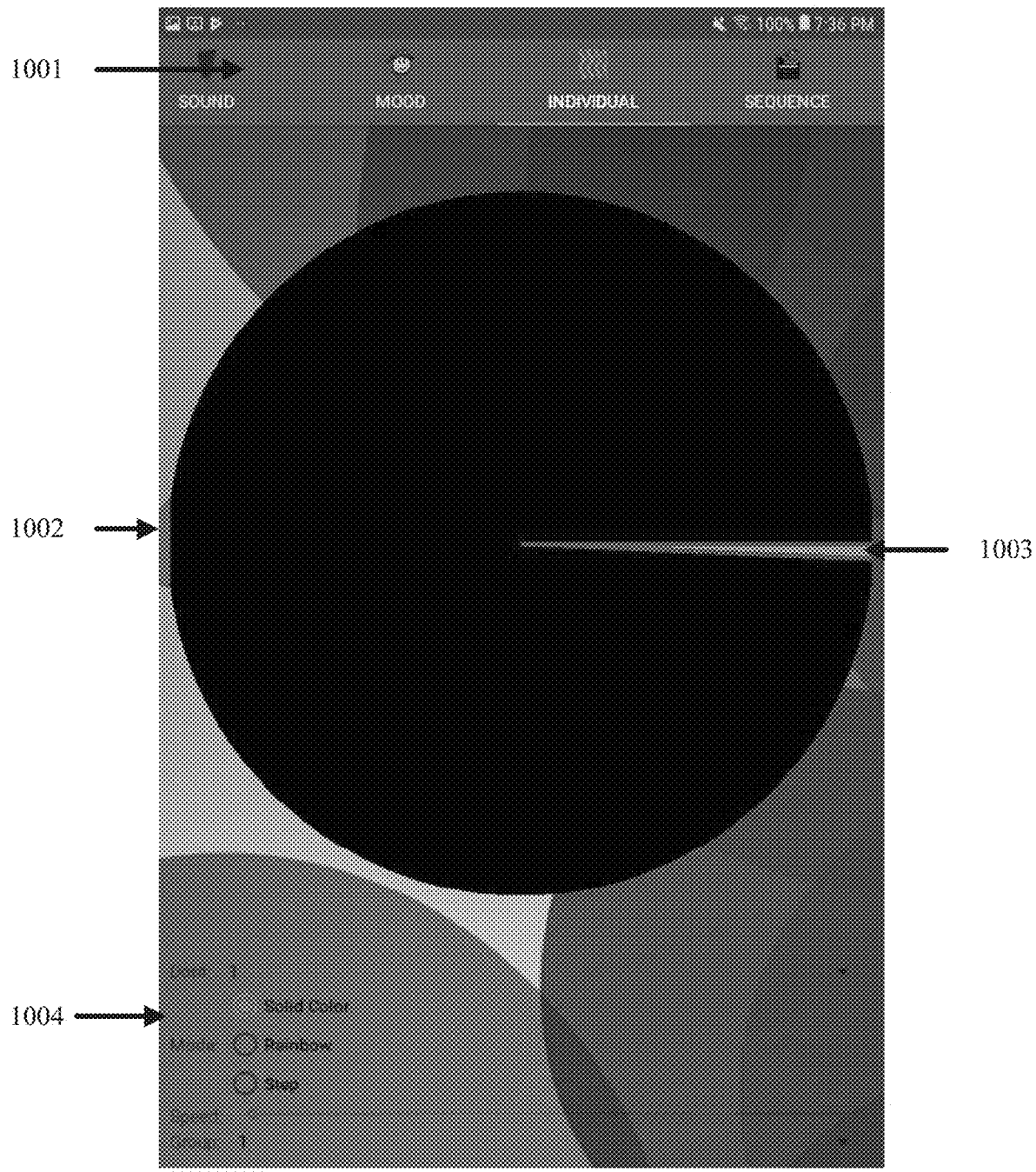

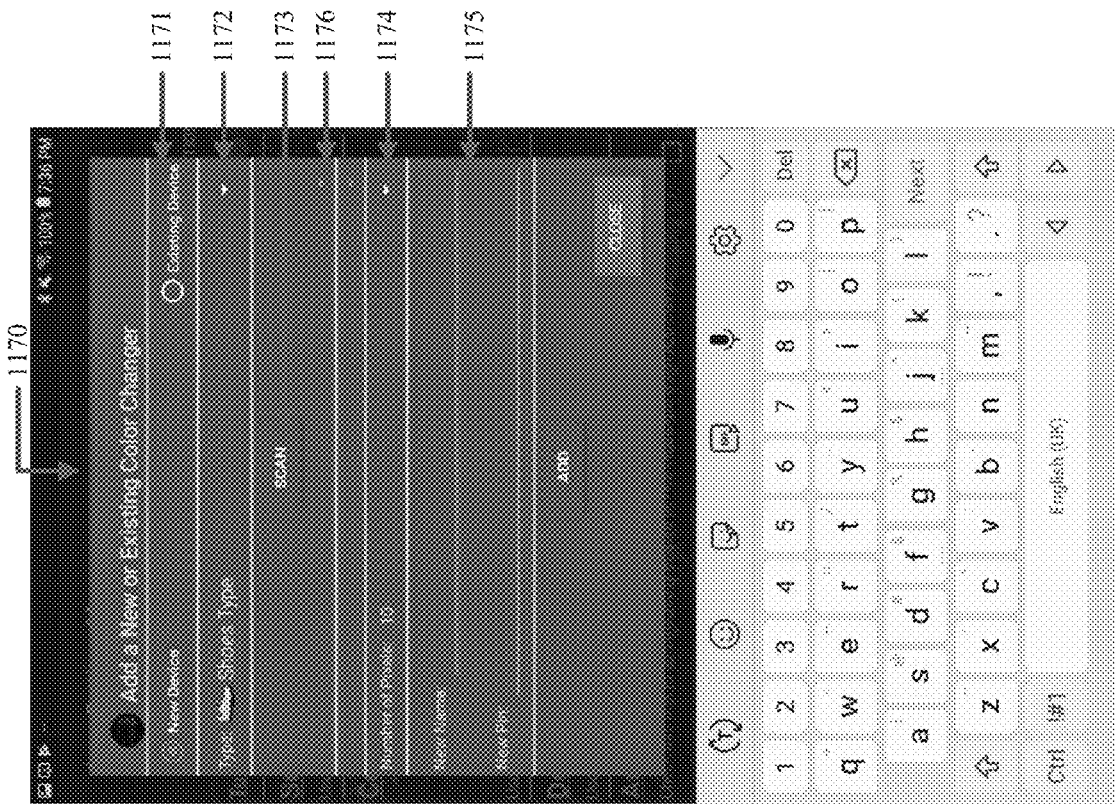
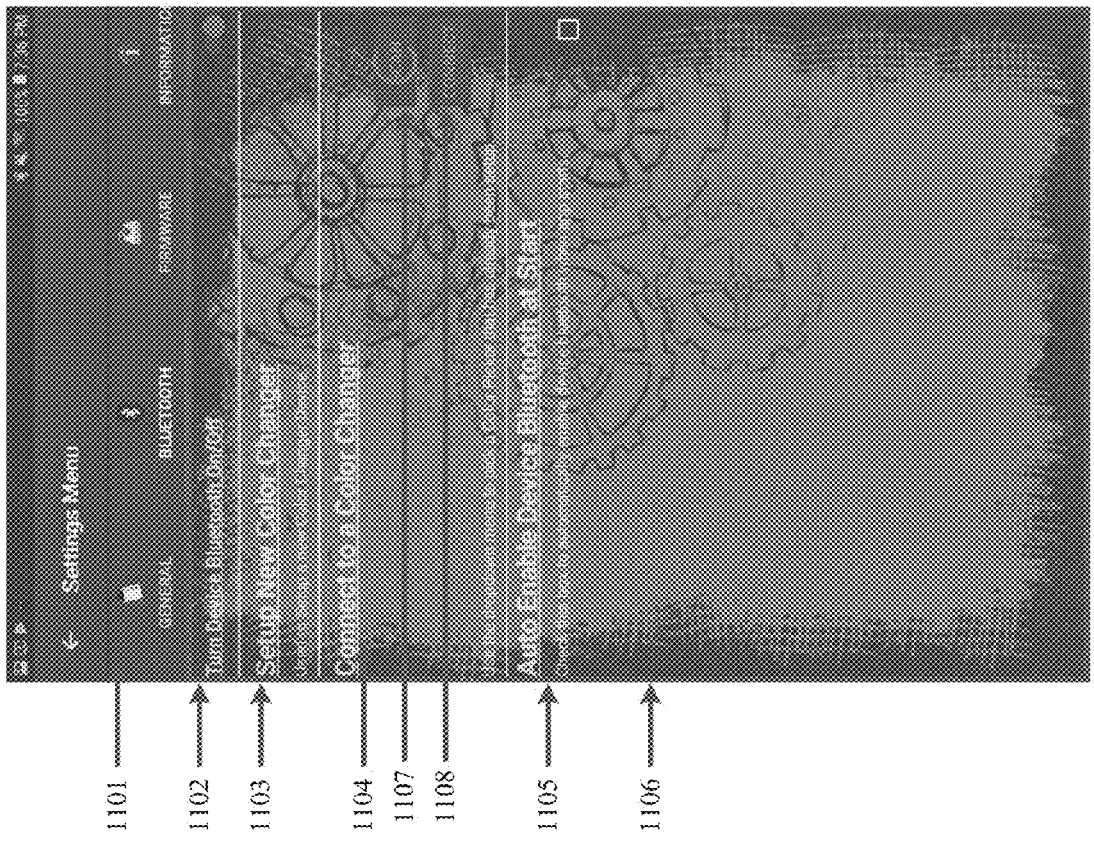

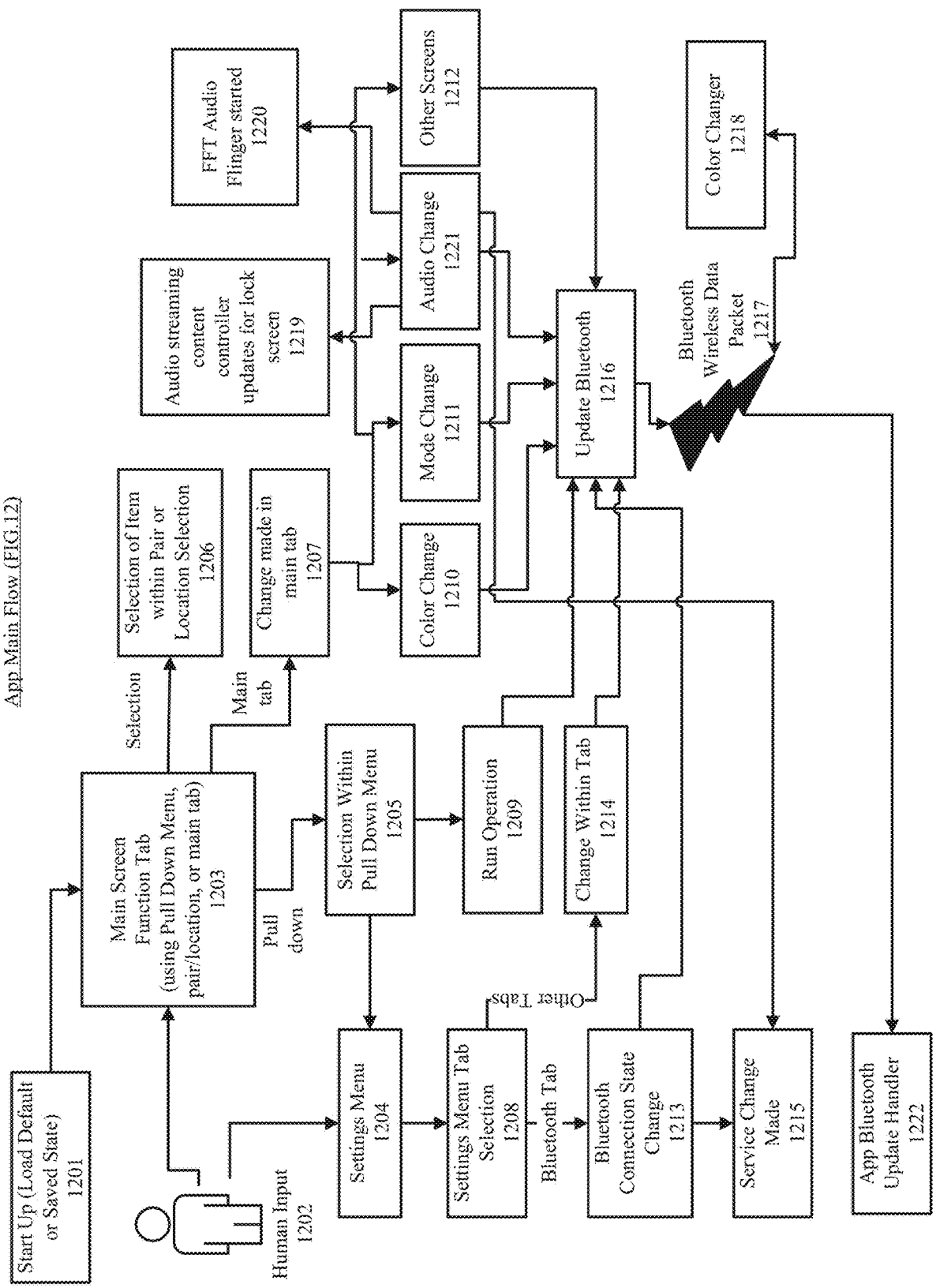

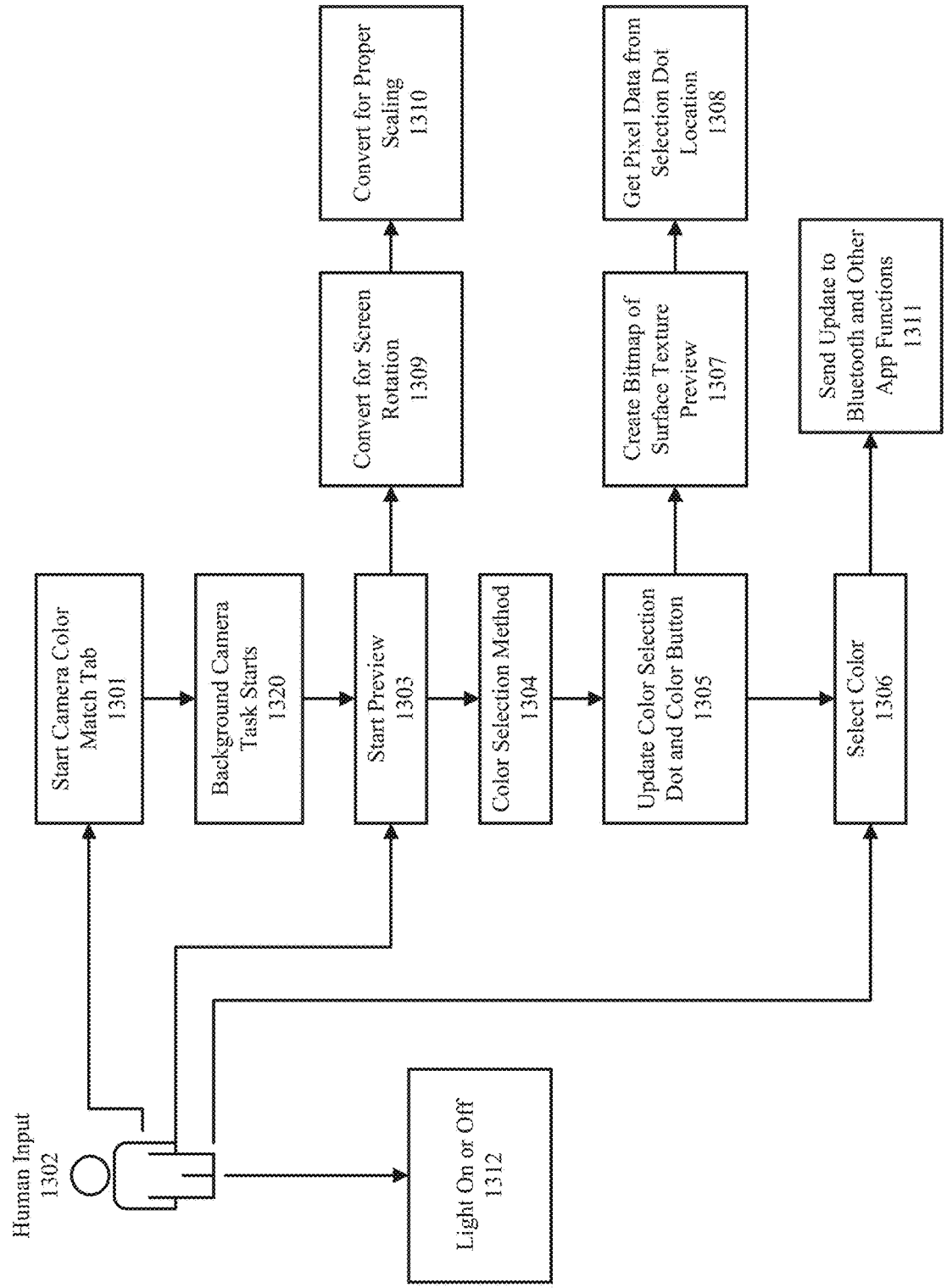

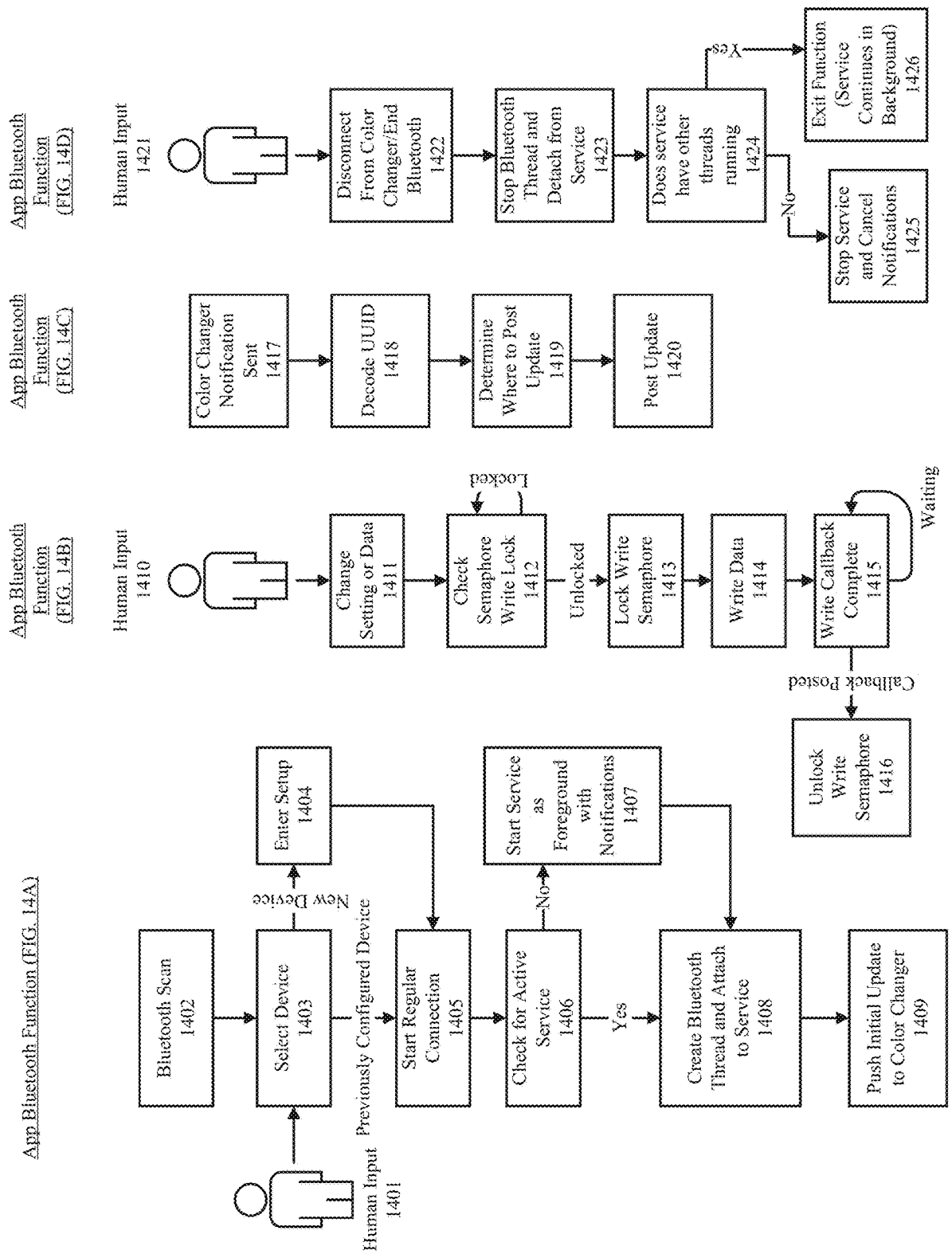

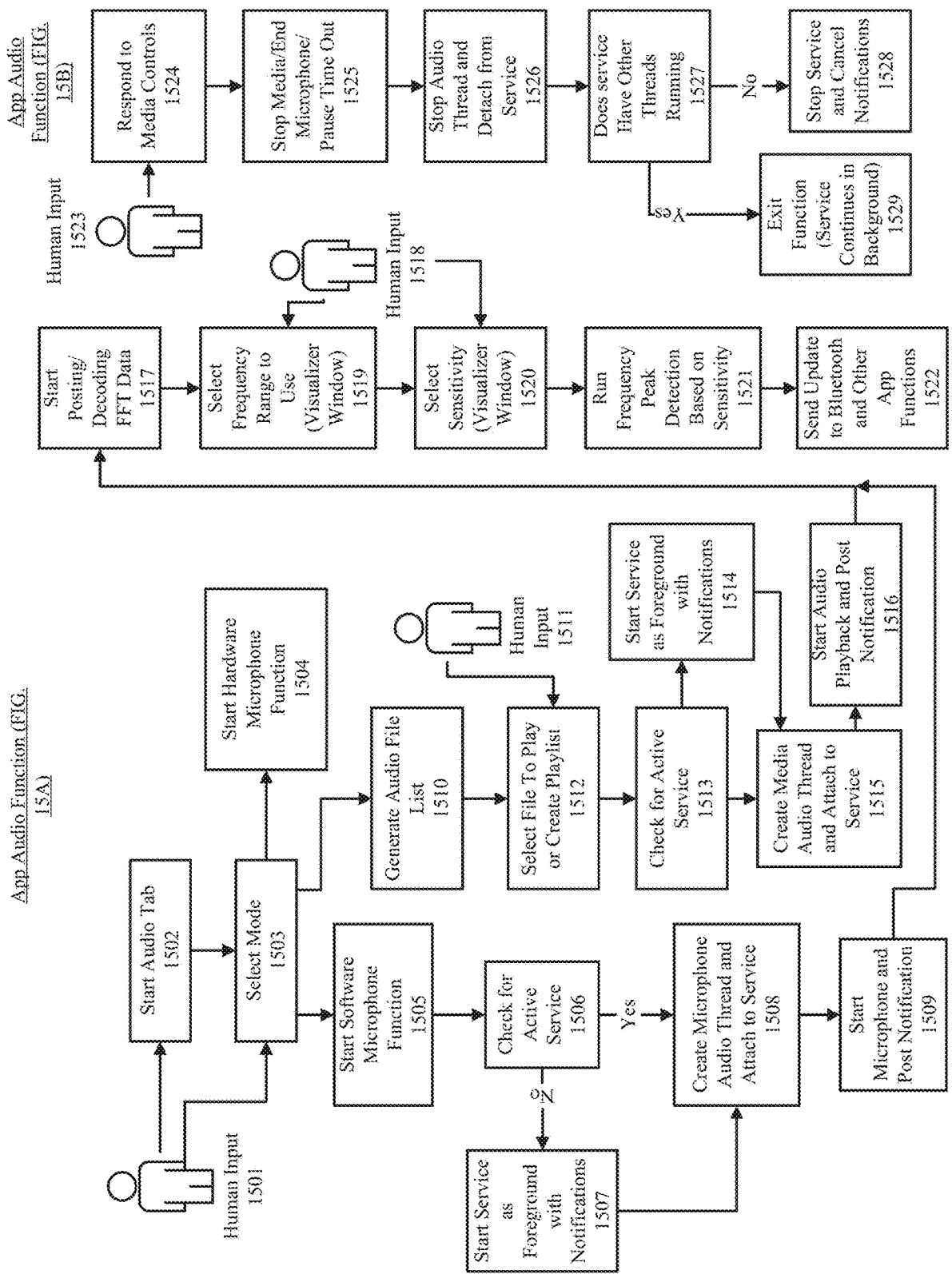

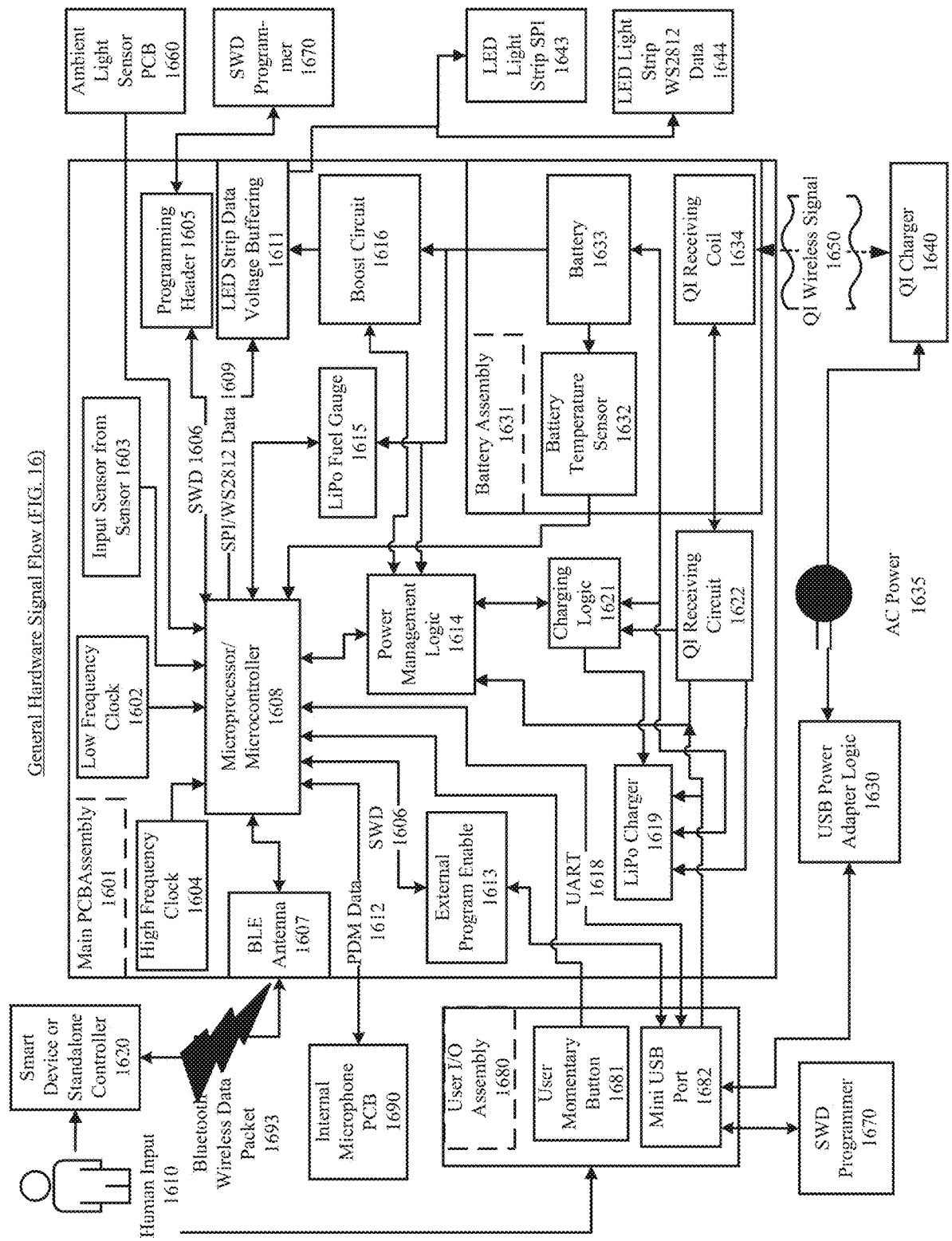

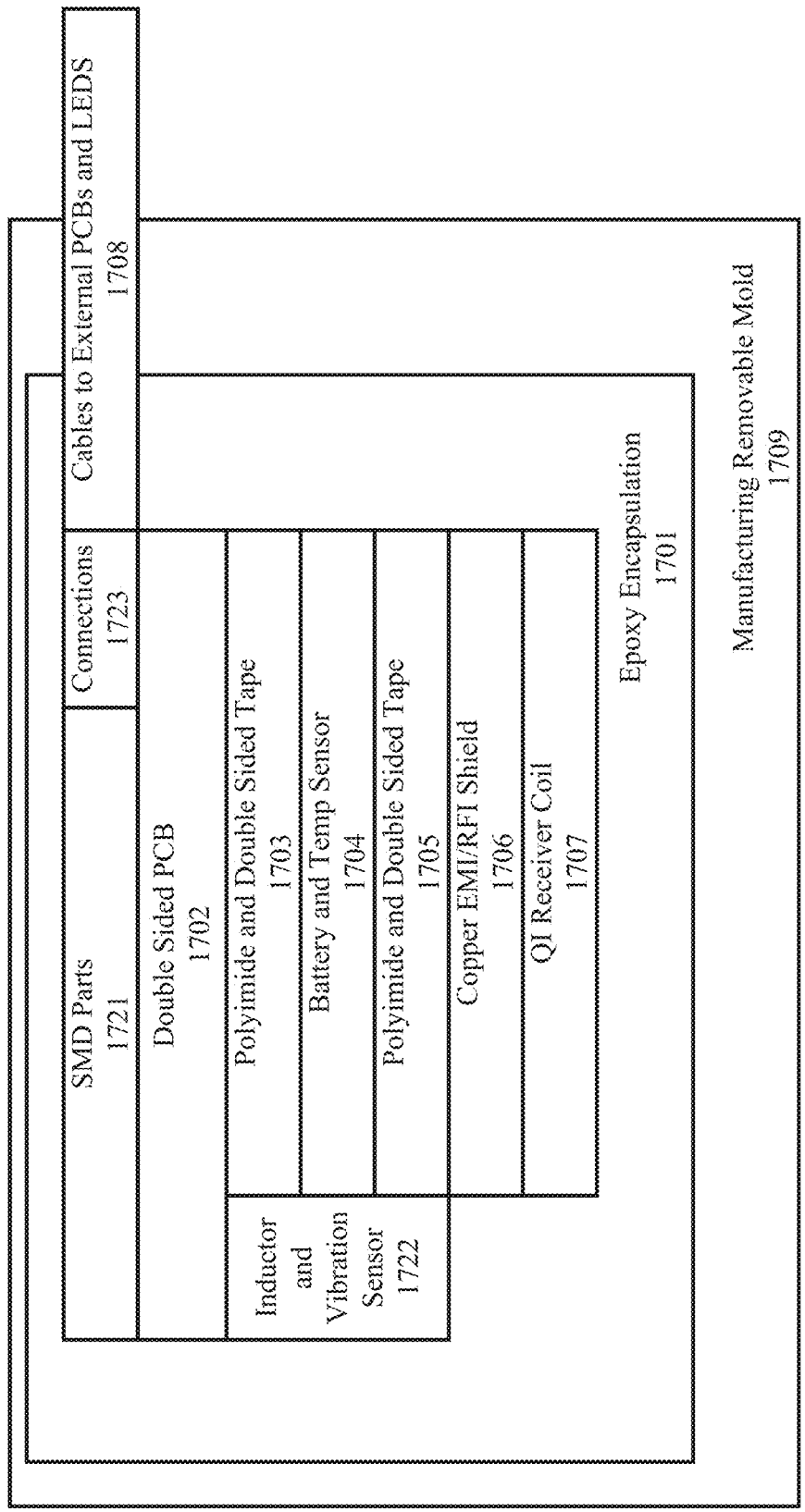

Hardware PCB General Layout (Front) FIG. 18A
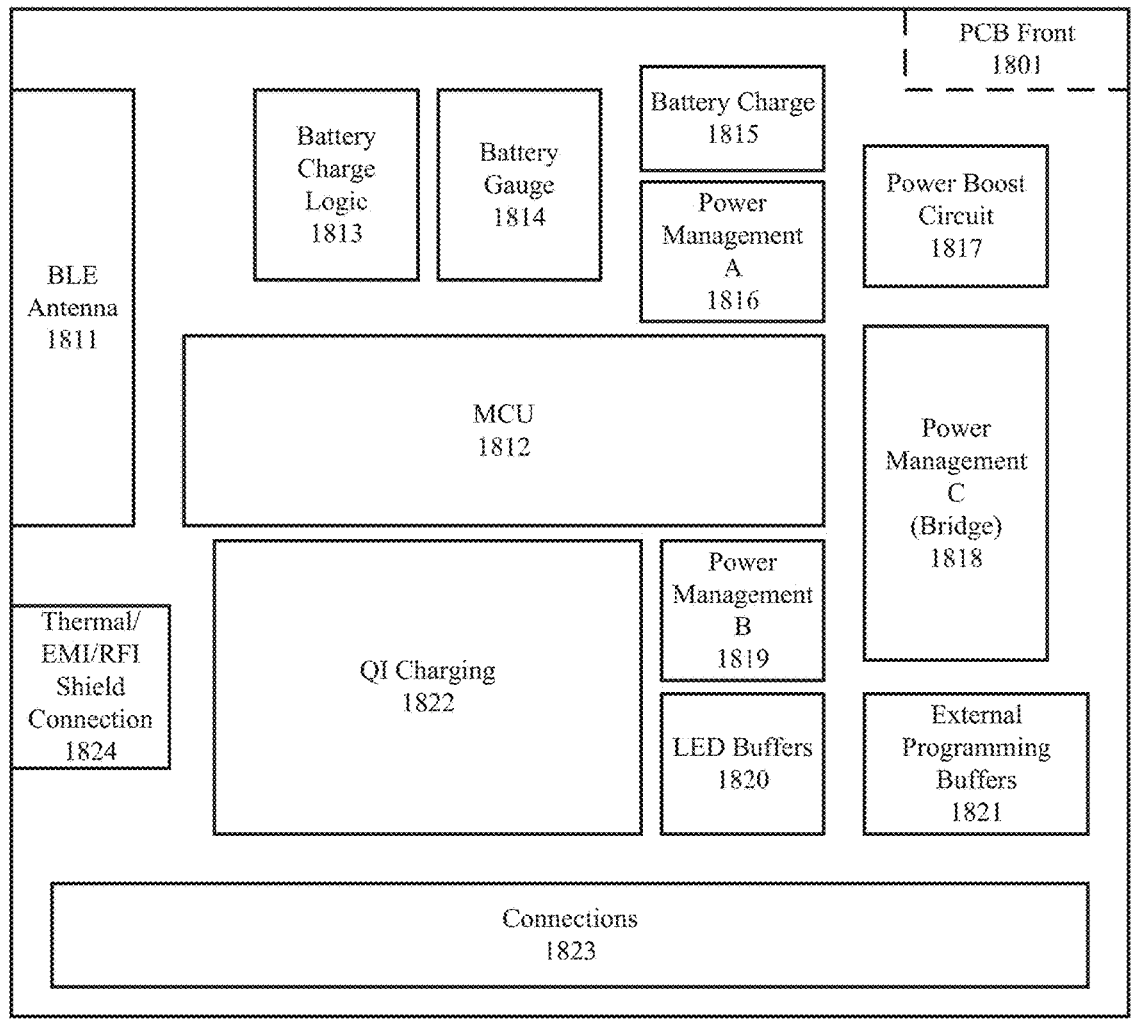
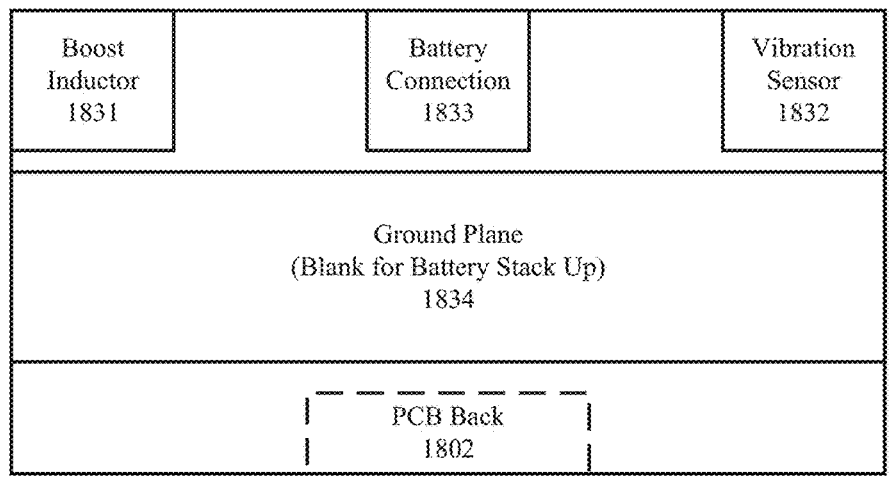
Hardware PCB General Layout (Back) FIG. 18B

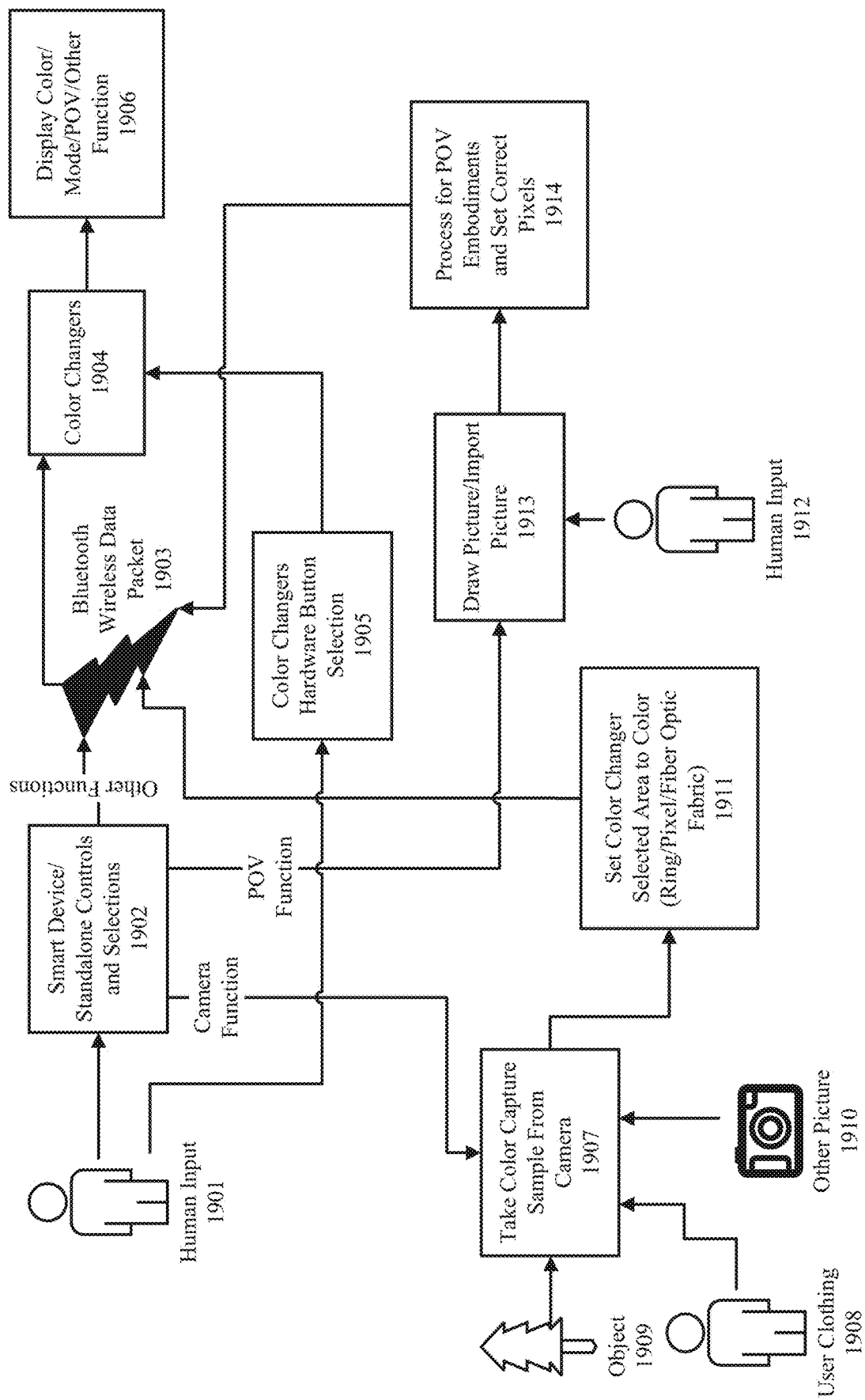

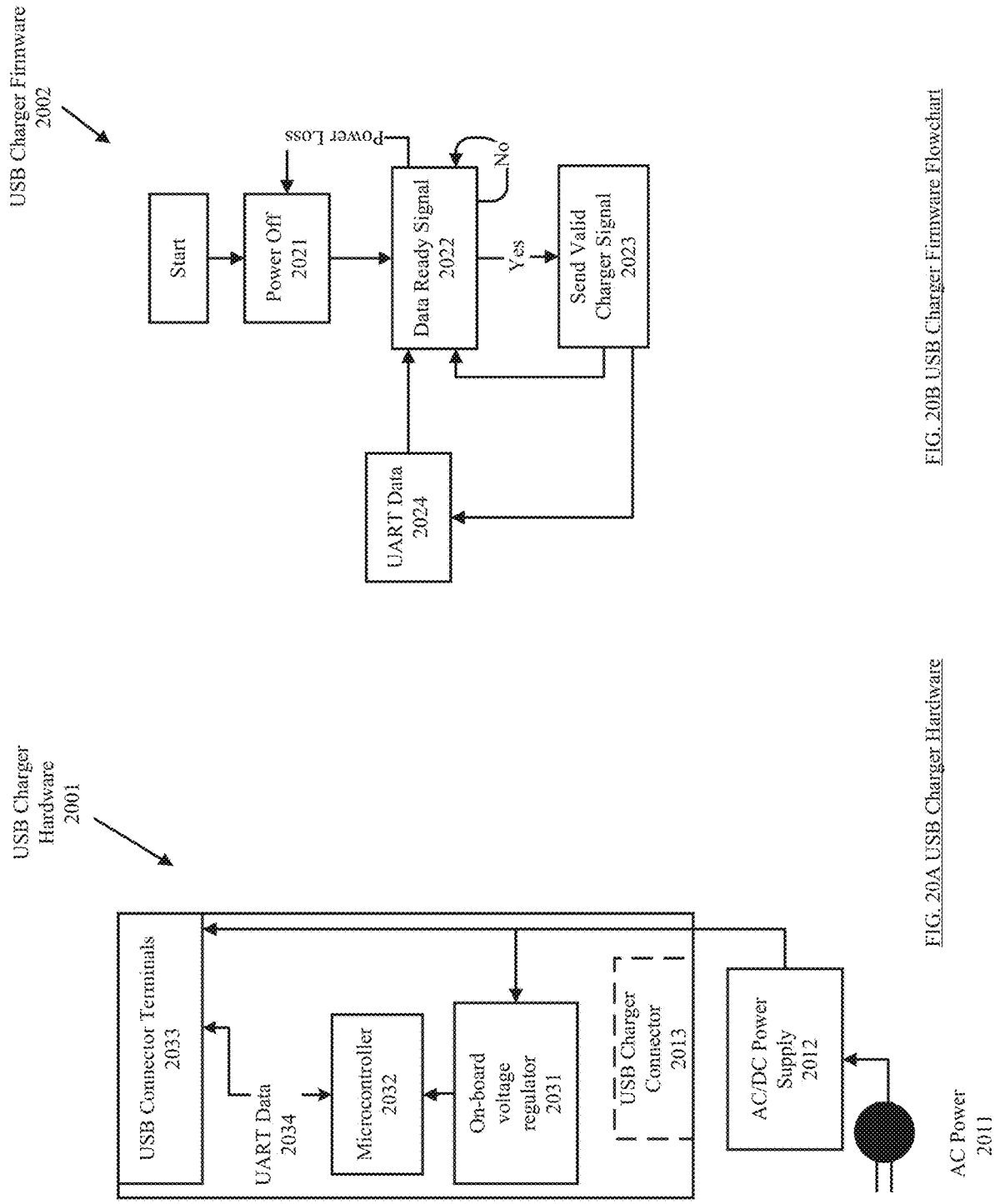
FIG. 20B USB Charger Firmware Flowchart
FIG. 20A USB Charger Hardware

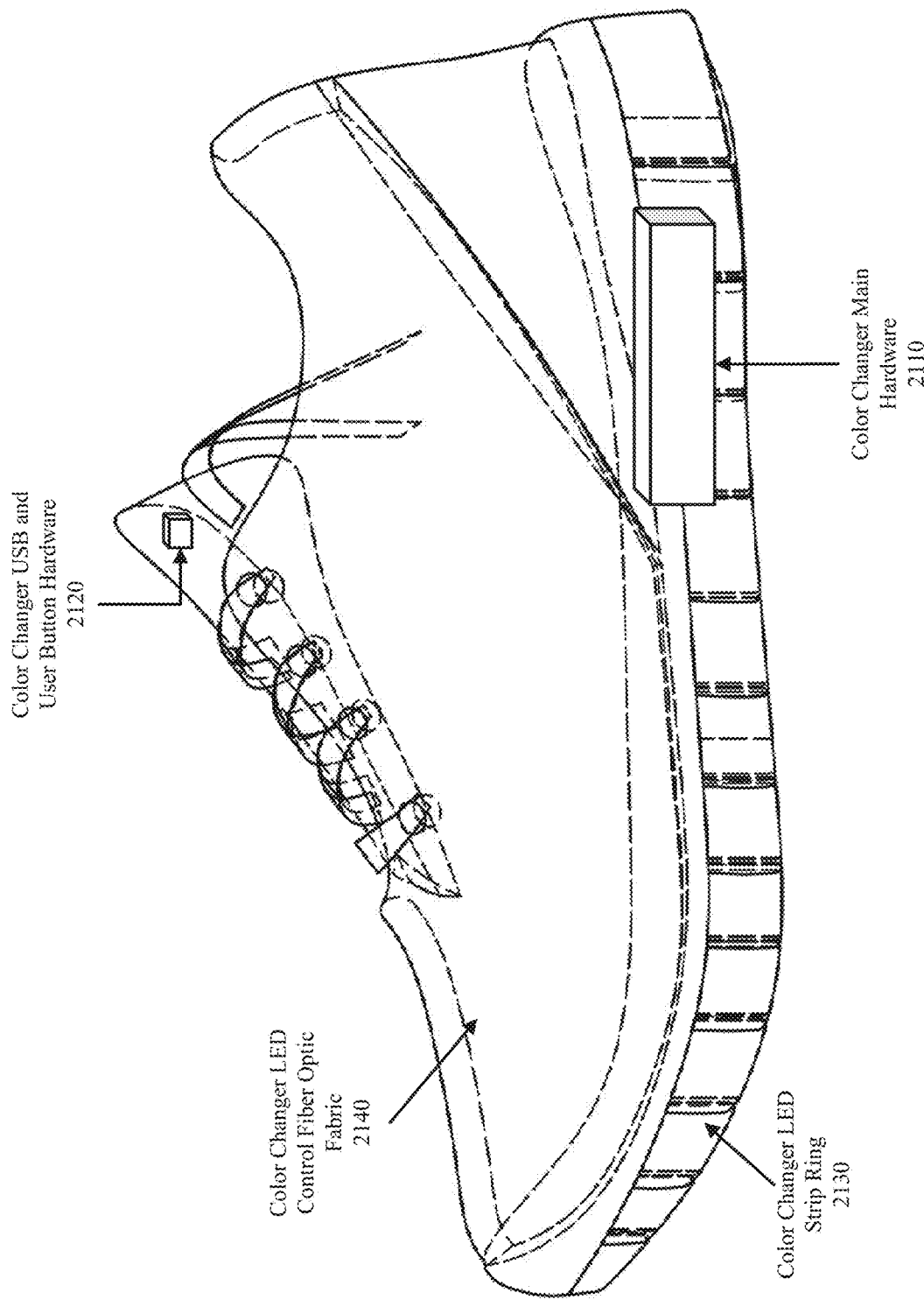

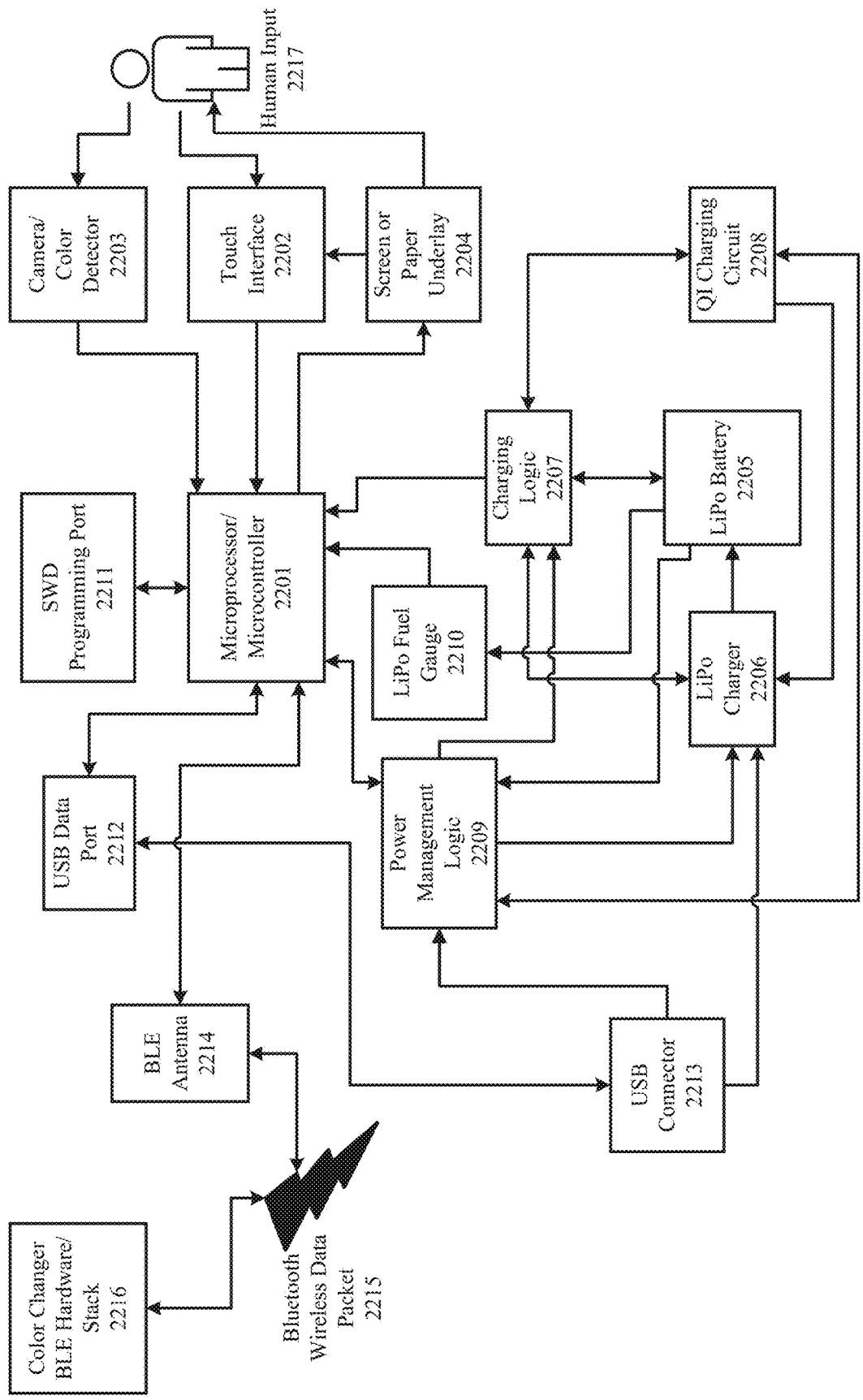

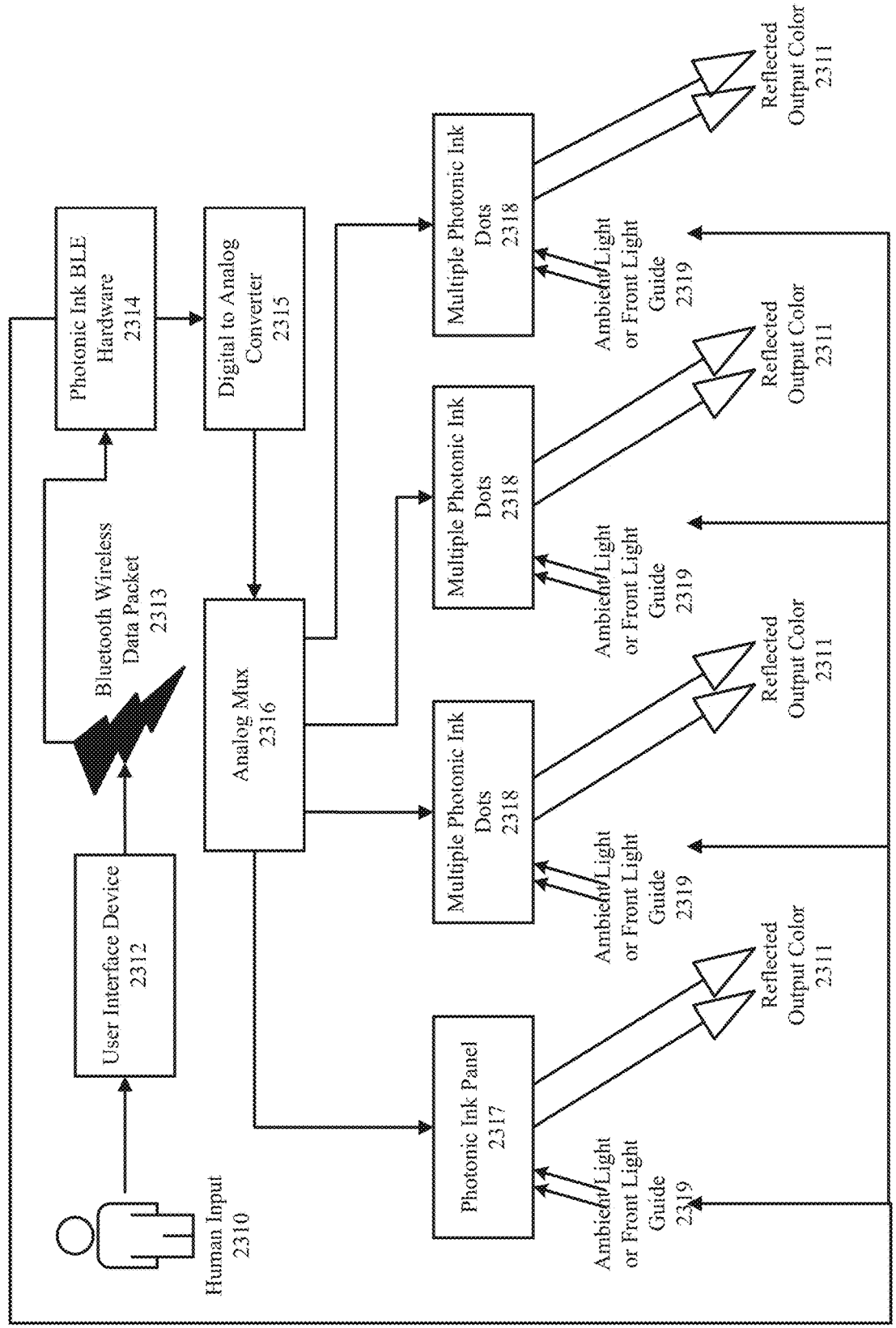

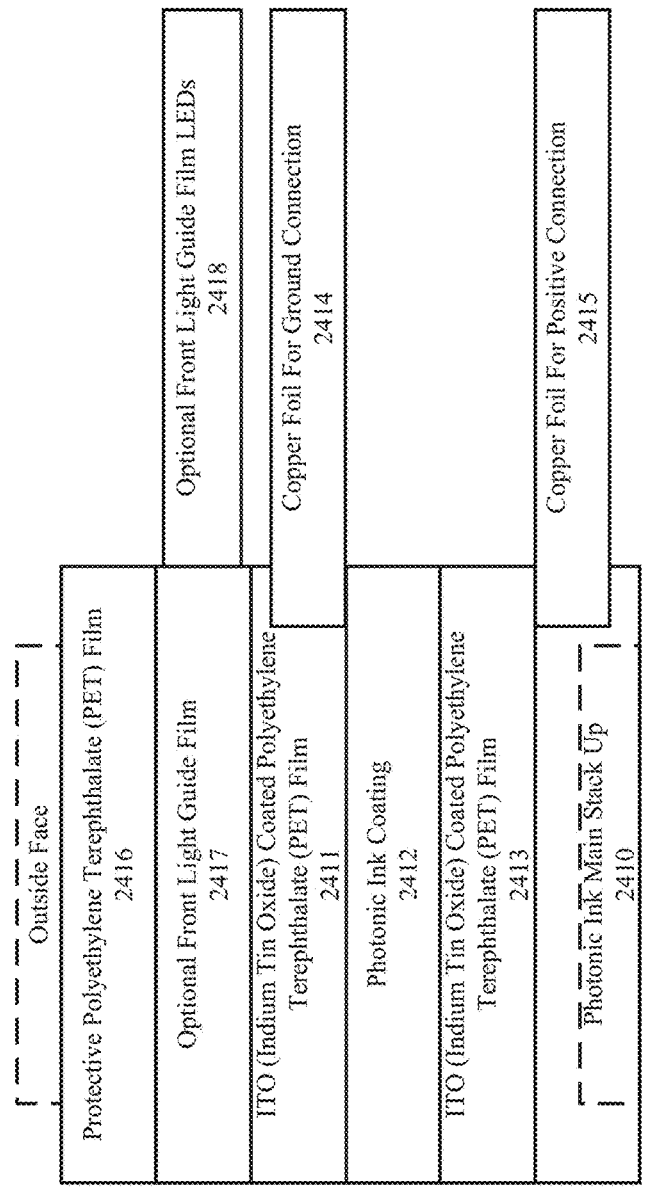
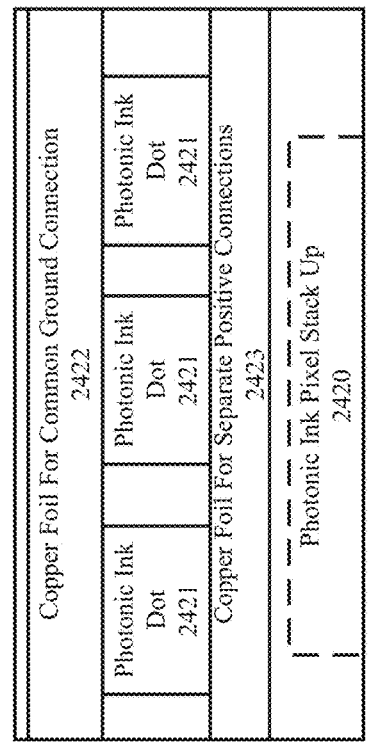

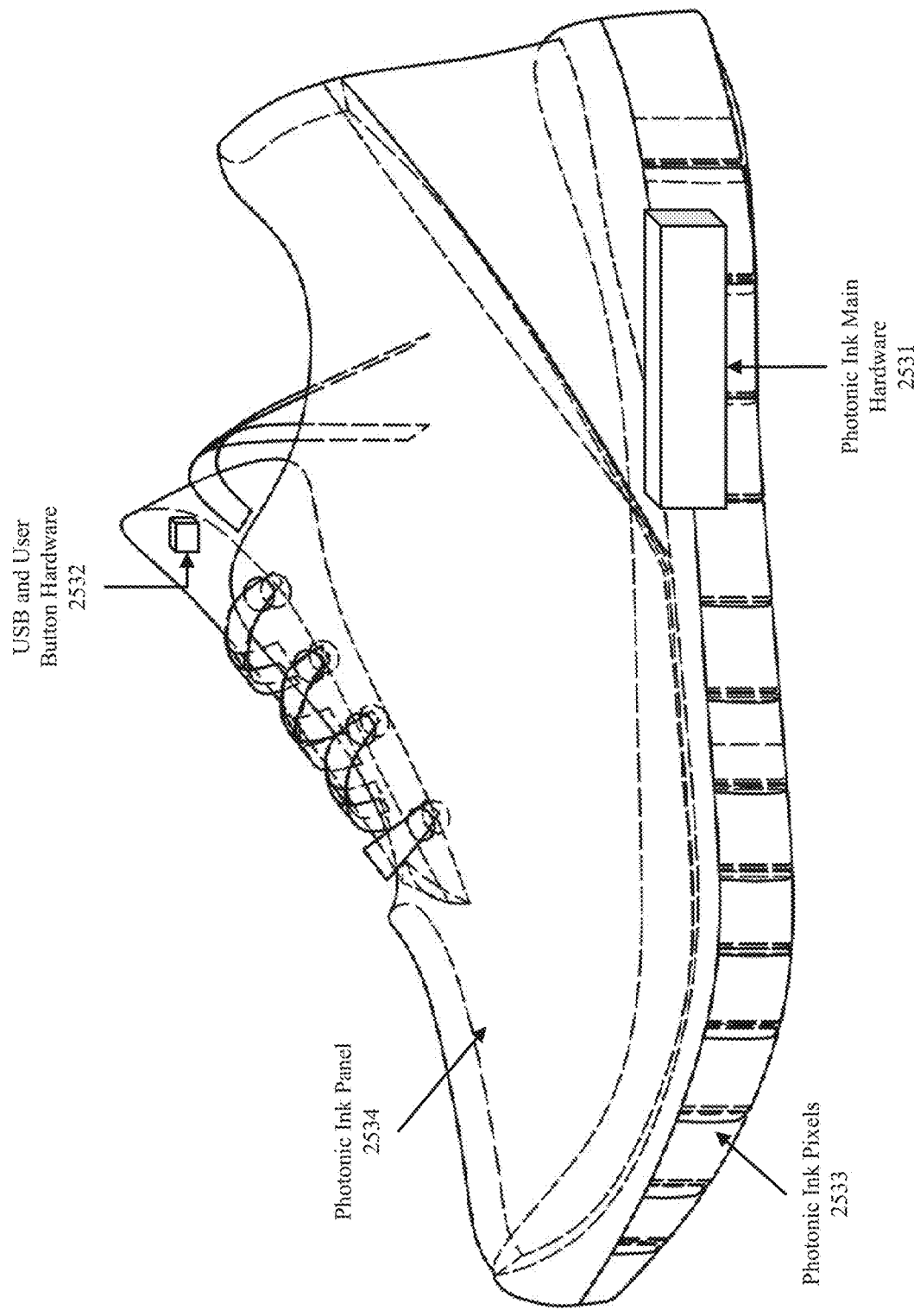

SMART DEVICE CONTROLLABLE LED-BASED COLOR CHANGING APPAREL AND DEVICES

TECHNICAL FIELD

This technology relates to smart devices to change and control colors, text, images, and patterns of apparel, devices, and accessories. More specifically, the technology relates to user-controlled software and hardware processors and integrated circuits that set and change colors, text, images, and patterns of apparel and devices, including shoes.

BACKGROUND

There are currently shoes on the market that allow for flashing lights based on movement when the user takes a step. Other shoes available on the market have an LED ring around the sole of the shoe, which changes to a few pre-set colors or patterns. After testing these shoes, it was found that many of the applications ("apps") used to control the shoe colors do not function properly. The existing apps have problematic Bluetooth communication, lack many customization options or modes, and have a limited number of app features. Further, previous devices lack adequate input-detection or color-selection processes. The prior devices do not have a camera color selection function or FFT for audio detection. The prior apps also are limited to working only in a shoe embodiment, and none have a persistence-of-vision function. Other devices and apparel on the market using LED illumination lack sophisticated user interfaces. Prior shoes and other apparel on the market use fiber optic fabric to illuminate a large percentage of the body of the apparel. These items only change to a few preset colors and tend to have color convergence issues when mixing colors beyond the primary red, blue, and green.

Other attempts to improve the state of the art of color changing articles have similarly fallen short. For example, recent shoes that have a flexible OLED or e-ink displays on the side of the shoe have problematic displays that are too fragile to hold up to the mechanical stresses placed on shoes and other clothing. These displays also often require a great deal of processing power that make the electronics too bulky and inefficient to run off a small power source. Many manufacturers make shoes with the same design with fabric that is pre-died to a specific color. These manufacturers often make many colors of the same design requiring the consumer to purchase multiple pairs of the same shoe with different colors.

SUMMARY

The invention allows consumers to use a smart device or standalone controller to change colors and patterns according to the consumer's desire for their apparel, devices, and various accessories. This customization allows the consumer to either add a custom style, color, or reaction to their apparel or other device giving them the same diversity as owning multiple articles. One example embodiment of the invention includes shoes with LED rings around the soles and/or LED fiber optic fabric. Other example embodiments of the invention include photonic ink as a color medium. Further, other example embodiments of the invention use E-ink (electronic ink) to display text and patterns, as well as combinations of photonic ink to create pixels or matrices. Other example embodiments of the invention display color, text, images, or pattern media. The invention is used in other types of wearables, devices, and other fields including clothing, home décor, product casing, sports equipment, vehicle interiors, entertainment apparel (e.g., slapsticks and head bands), and other fields.

In one example embodiment of the invention, the color changing feature is performed by either color selection, or by scanning a selected color into a user interface by either a camera or color sensor. The color data is then processed and corrected based on how humans perceive color and ambient light to make the color displayed as accurate as possible. The software of the invention allows for multiple patterns including, but not limited to, rainbow color changes, foot-movement based changes, audio-based changes, and persistence-of-vision based changes. Persistence-of-vision based changes paint a picture based on user input. One example embodiment of the invention using persistence-of-vision based changes, includes rotational movement-based objects, such as a bike tire, for example. In some example embodiments of the persistence-of-vision examples of the invention that use high quality graphics, an external graphics chip is used to handle sensor input and to buffer the pixel data in order to get improved resolution and update speeds. Other example embodiments of the invention allow a graphical based change to occur with the use of a display or ink. Other embodiments of the invention include color changes based on a "mood" function, which may be presented to a user to work in a fashion similar to a mood ring or a pet rock, which are presented to show a particular mood ascribed to a human or object, respectively.

The devices of the invention are rechargeable via a customized charger or a wireless Qi charger. The devices of the invention communicate with a UI (User Interface) device, such as a smartphone or standalone controller, via customized services and characteristics over Bluetooth Low Energy (BLE). Other example embodiments of the invention use Bluetooth Classic, with protocol overlays to communicate. Other example embodiments of the invention use wireless communication standards to communicate. The UI devices' app or firmware and the shoe's firmware use customized algorithms in order to function and generate user requests.

Other example embodiments of the invention include skateboards, dog collars, dog leashes, jump ropes, inflatable inner tubes, bike tires, wrist slapsticks, fiber optic hats, fiber optic backpacks, beach balls, and Christmas tree lights. Other example embodiments of the invention include E-ink displays for text or patterns in all or part of the overall display. The shoe embodiments of the invention include many variations and combinations. Some of these include roller shoes, sandals, boots, fiber optic fabrics covering most of the shoe body, LED ring in the sole, or a combination of embodiments. The shoes are equipped with an onboard ultra-low energy microcontroller integrated circuit that also includes a system on chip (SoC) BLE radio. This integrated circuit performs BLE functions, maintenance functions, and color update functions, which include either solid color or specialty timed functions, such as rainbow, foot movement, sound detection, mood, persistence of vision, or sequence-based functions. The shoes are charged using a mini USB port, or charged using wireless Qi charging. Other embodiments of the invention charge devices using other connectors or wireless charging protocols. The shoes are controlled by a UI device, which can be either a smart device, such as a smart phone or tablet, or a standalone controller. The smart device apps are used with Android operating systems, iOS-based devices, and others. The background code and processes run natively and specifically for each operating system. The UI functions run on unique, customized software, and the hardware uses customized firmware for its logic and functionality. In one example embodiment of the invention, optics for the shoes use LEDs or LED-driven fiber optic fabric to produce the colors and color patterns, while other embodiments produce colors, graphics, and text using other devices and fabrics. In one example embodiment of the invention, the optics are performed using E-ink (electronic ink), P-ink (photonic ink), electrochromatic devices, or OLED (organic light-emitting diode) technology and allow for a smaller current draw. Other embodiments of the invention use flexible light guides, thereby using fewer LEDs.

In one example embodiment of the invention, a system for changing the color of an article with a smart device includes a color changing software application. In another example embodiment of the invention, a system for changing the color of an article includes a dedicated control circuit. The color changing software applications and the dedicated control circuits provide instructions to computer processors in the color change article to affect the color changes. The color changing software application executes software application-based instructions to affect the color changes while the dedicated control circuit uses firmware-based instructions to affect the color changes.

The color changing application includes instructions stored on a non-transitory computer-readable medium executed by a processor of the smart device. The dedicated control circuit similarly provides the executable instructions to a processor of the color changing article and is included in a (standalone) controller. In some embodiments of the invention, the standalone controller can be thought of as a hardware device with control circuitry and ancillary circuitry that enables the standalone controller to send executable instructions to a processor of the color changing article. In each case, the executable instructions include instructions for selecting a type of article for which the color change is executed, selecting a color sequence for display on the article, and sending executable commands from the smart device to an electronic control circuit of the article to generate a control signal to a colored light source upon receipt of the executable command from a user interface of the smart device (or standalone controller). The colored light source can be a colored light emitting source and/or a colored light reflecting source.

The color changing article can include wearable articles, such as shoes, pants, shirts, and other apparel, for example. Likewise, the article can include a hard good, such as a toy, a sporting good, a decoration, a household item, a pet accessory, and other articles that are not typically worn. In one example embodiment of the invention, the color sequence is randomly generated when a color change circuit in the article is restarted during initial set up or when a color change circuit in the article completes a factory reset.

The invention can connect the smart device to the article in a number of ways. For example, in one example embodiment, executable commands are sent from the smart device to an electronic control circuit of the article using a wireless communication protocol. In one example embodiment, the electronic control circuit of the article includes a system on chip (SoC) Bluetooth Low Energy transceiver. The executable instructions can include transmitting a communication connection request from the smart device and connecting the smart device to the electronic control circuit of the article when the communication connection request is granted by the electronic control circuit of the article. Further, the communication connection between the smart device and the electronic control circuit is maintained when the color changing application is closed, such as, for example, to preserve smart device audio playback, smart device microphone audio processing, and firmware updates. For example, the executable commands sent from the smart device to the electronic control circuitry of the article can include an output effect setting command that is saved in the article for execution by the electronic control circuit of the article to maintain the color sequence for display on the article when the color changing application is closed or disconnected. The executable commands sent from a smart device to the electronic control circuitry of the article can also include a selected color and/or a visual output effect. Other commands can also include effect update commands and firmware update commands. Other commands sent from the electronic control circuitry of the article to the smart device can include battery updates, system information, and step updates.

The invention can include a smart device that includes a color change selector. The color change selector creates an executable command for generating an operational signal for a colored light source to generate and display a visual output. The color selector can take many forms. For example, the color change selector can include a camera (of the smart device, for example) for providing a video signal in the smart device that is processed and sent as an executable command to the electronic control circuit in the color change hardware in the article. The electronic control circuit in the color change hardware, in turn, provides a control signal to the colored light source to generate/change/display a visual output. Likewise, color change selectors can include a color detector or color sensor (of the smart device or standalone controller, for example) that is processed and sent as an executable command to the electronic control circuit in the color change hardware in the article, which provides a control signal to the colored light source to generate/change/display a visual output. Additionally, the color change selector can take the form of a software slider or other software control, such as, for example, effect selection, persistence of vision (POV), mood selection, audio detection, patterns, images, and text in a user interface of the smart device that receives a user input, processes that user input and sends an executable command to the electronic control circuit in the color change hardware in the article, which in turn provides a control signal to the colored light source to generate/change/display a visual output.

Further, a color change selector can be included in the article itself. For example, a color change selector can be a microphone on the article for providing an audio signal, a vibration sensor for providing a vibration signal, an accelerometer for providing a force of acceleration signal, a Hall effect sensor for providing a rotational signal, a motion sensor for providing an object awareness signal, and/or a color detector that generates a detected color signal, all of which can be received as operational signals by the electronic control circuit on the article to create a control signal for the colored light source to generate and display a visual output.

As outlined above, a color changing article in accordance with the invention includes an electronic control circuit, a colored light source, and a luminous substrate for receiving the colored light emitted from the colored light source and for generating and displaying a visual output. A processor in the electronic control circuit generates a control signal to the colored light source upon receipt of an executable command from a user interface of a smart device or (standalone) control circuit and upon receipt of an operational signal from a color change selector on the article itself. As outlined above, the article can also include additional optional devices that can be used as a color change selector to determine the color/pattern of light. For example, the article can include a microphone for providing an audio signal to the electronic control circuit to select the colored light generated by the colored light source and received by the luminous substrate. The article can also include other sensors and detectors as color change selectors for providing operational signals to the electronic control circuit to select the colored light generated by the colored light source and received by the luminous substrate. For example, the other sensors and detectors can include a vibration or other input sensor for providing an operational signal to the electronic control circuit to select the colored light generated by the colored light source and received by the luminous substrate. Further, the article can include an accelerometer for providing a force of acceleration signal to the electronic control circuit as the operational signal used to select the colored light generated by the colored light source and received by the luminous substrate. Hall effect sensors and/or motions sensors can also be used to provide an operational signal to the electronic control circuit used to select the colored light generated by the colored light source and received by the luminous substrate.

The articles can also include additional devices that provide additional features. For example, the article can include a wireless Qi charger, a non-Qi inductive charger, a mini USB charger port, and/or a magnetic charger port. The articles can also include an electronic switch, a mechanical switch, and/or a software application-activated switch for providing a starting control signal, a selection control signal, and a power state change control signal.

The articles can incorporate different types of luminous substrates. For example, the article can include a luminous substrate that includes a light emitting medium and/or a reflecting medium. Luminous substrates include both materials upon which light falls and materials from which light emanates. For example, in an embodiment of the invention using LEDs, the electronic control circuit of the article can send a control signal to the colored light source (i.e., the LEDs) to generate a colored light. The colored light then falls on a portion of the article (i.e., the luminous substrate) that then appears (and is perceived visually) to be the color of the light generated by the colored light source. In other example embodiments of the invention, the luminous substrate can include materials that house a fiber optic ring, or an LED pixel ring, or a (flexible) light guide. The luminous substrates in accordance with the invention work in tandem with the colored light sources to generate and display the colored light, and some of the functions and properties of the colored light sources and the luminous substrates can overlap. For example, other luminous substrates can include materials that house electronic ink (E-ink) and photonic ink (P-ink). In these example embodiments of the invention, the colored light source may be integrated in the luminous substrate or the colored light source may be ambient light that the luminous substrate uses to reflect the user requested color. Other similar examples include luminous substrates that include a photonic pixel ring, a photonic display, electrochromatics, organic light-emitting diodes (OLEDs), and/or an electroluminescent (EL) displays.

The article can display different types of visual outputs generated by the color changing optics. For example, the generated visual output can be a solid color, a rainbow effect, a looping effect, mood effect, a color created by a persistence of vision effect, a pattern effect, an image, a pictorial representation, and/or text. The colored light source can be transmitted through color convergence and focusing optics onto a luminous substrate.

Systems, in accordance with the invention, include a color changing article or device that includes a light emitting or reflecting medium and color changing hardware. A smart device or other standalone controller provides instructions to the color changing hardware to produce colors in the medium, which changes the colors in the article or device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 shows an overview of one embodiment of firmware in accordance with the invention that runs on a microcontroller and controls hardware-based functions.

FIG. 2 shows an overview of one embodiment of a bootloader section of the firmware, in accordance with the invention, that controls firmware updates, charging modes, and power modes, including battery level, enter main firmware, and factory reset.

FIG. 3 shows an overview of one embodiment of main firmware, in accordance with the invention, that controls setup and user and Bluetooth functions.

FIG. 4 shows an overview of one embodiment of the setup loop, which is used the first time a device is setup or after a factory reset occurs.

FIG. 5 shows an overview of one embodiment of the main program loop that controls display modes, peripheral interrupt handling, Bluetooth control, as well as running temperature, button press, and charging mode checks.

FIG. 6 shows a UI Screenshot of a camera selector tab for one example embodiment of an app, in accordance with the invention, that allows a user to select a color using a UI device camera.

FIGS. 7A-7B show UI screenshots of a color wheel tab for an app, in accordance with the invention, that allows a user to select a color using the color wheel and HSV gradient, and allows them to enter a color code in RGB, HSV, or Hex color space numbers.

FIGS. 8A-8B shows a UI screenshot for a mode selection tab and other drop downs for an app, in accordance with the invention, that allows a user to pick a mode and a speed setting, as well as to select brightness, sharing, copying, battery information, file functions, and settings.

FIGS. 9A-9B shows UI screenshots of an audio detection tab, in accordance with the invention, that includes a list of music files, playback controls, the option to use the UI device's microphone, the option to use an internal microphone, and a beat visualizer.

FIG. 10 shows a UI screenshot of an individual tab for an app, in accordance with the invention, that allows a user to modify each LED in a ring separately, which allows for a large number of custom patterns.

FIGS. 11A-11B show UI screens for a Bluetooth tab of a settings menu activity for an app, in accordance with the invention, that includes setup and deletion of devices, addition of existing devices, connection and scanning for devices, naming of devices, and other UI device-specific Bluetooth functions.

FIG. 12 is an overview of a main process flow of an app, in accordance with the invention, that shows a manner in which a user interacts with the app to produce an output on the hardware.

FIG. 13 is an overview for a flow of a camera function of an app, in accordance with the invention, that shows how a user interacts with the camera tab of FIG. 6 above to select a color.

FIGS. 14A, 14B, 14C, and 14D are an overview of process flows of Bluetooth functions for an app, in accordance with the invention, that shows how a user and app functions interact with Bluetooth handlers and how background Bluetooth functions interact.

FIGS. 15A and 15B are overviews of process flows and user interactions of an audio tab, shown in FIG. 9, and background audio functions for an app, in accordance with the invention.

FIG. 16 is an overview of a general hardware signal flow in accordance with one example embodiment of the invention, showing how different hardware components interact with each other.

FIG. 17 shows a diagram of a hardware stack-up that shows an order of layers of different hardware components in one example embodiment of the invention.

FIGS. 18A and 18B show a general hardware layout of a front (FIG. 18A) and rear (FIG. 18B) PCB (Printed Circuit Board), in accordance with an example, embodiment of the invention showing general locations of hardware.

FIG. 19 shows a general user control and interaction flow overview and the manner in which a smart device is used to control hardware to produce a response in one example embodiment of the invention.

FIGS. 20A and 20B show an overview of a USB charger, in accordance with the invention, its hardware interactions with other system hardware, its signal path, and functionality of the USB charger firmware.

FIG. 21 shows an example of an assembled color changer shoe embodiment of the invention.

FIG. 22 illustrates an example standalone controller hardware signal flow and user interaction, in accordance with the invention.

FIG. 23 shows an example photonic ink general hardware flow along a signal path from human input to photonic color output, in accordance with the invention.

FIGS. 24A and 24B are example photonic ink stack-up diagrams, including layers of material to create a photonic ink coating, in accordance with the invention.

FIG. 25 illustrates an example shoe embodiment of the invention showing assembly locations for photonic ink panels and pixels.

DETAILED DESCRIPTION

Systems, in accordance with the invention, include a color changing article or device that includes a light emitting or reflecting medium and color changing hardware. A smart device or other standalone controller provides software instructions to the color changing hardware to produce colors in the medium, which change the colors in the article or device.

Firmware

Firmware is the software that runs on the hardware and is responsible for user functions, maintenance functions, inputs, and outputs. The firmware is written in a combination of C and C++. The firmware incorporates a SoftDevice (SD), written by Nordic Semiconductor, and performs the function calls relating to the System on Chip (SoC). The SoC controls Bluetooth Low Energy (BLE) functions. To make the firmware easily updatable and customizable, the firmware is broken up into sections, which are described below. Other example embodiments are written in other languages, use wireless protocol stacks in conjunction with the SoCs (e.g., SoftDevices), and use other cores and foundations.

FIG. 1 is the firmware overview, which shows how parts of the firmware interact with each other. The off state 101 is the entry point for the firmware, which will continue to be in the off state until activated by a General Purpose Input and Output (GPIO) button press 102 from an external input, such as human input 103, for example. The button press 102 may include a combination of different lengths of presses to trigger different events. When coming from the off state 101, the button press 102 automatically transitions into the Master Boot Record (MBR) 105 portion of the firmware. If the MBR 105 is blank, it automatically transitions back to the off state 101. If it is not blank, it will look for a bootloader begin address in the User Information Configuration Register (UICR) 104. If the bootloader address is found, it will start the bootloader in block 107. Otherwise, it will start the main firmware in block 110. The bootloader 107 is described in detail in FIG. 2. The bootloader 107 interfaces with the SoftDevice (SD) 112, if it is available, otherwise, it will rely on the non-volatile interrupt control structure. In the example embodiment of the invention described below, the non-volatile interrupt control structure is only directly used for system resets. Other calls to this structure are processed first by the SoftDevice SD 112. The bootloader 107 stores necessary working data in RAM 114 and uses its look up tables 108 for hard-coded values. It also uses the factory information of flash 106 for firmware update decisions, as well as the Flash Data Storage (FDS) 109. The bootloader 107 uses the SoftDevice (SD) 112 to decode wireless data packets 115, containing firmware update information. These wireless data packets are sent from the smart device, or standalone controller device 116, which are triggered by the human input 103. The bootloader 107 will eventually either transition into the off state 101, or into the main firmware 110. The main firmware 110, further described in FIG. 3, is responsible for the main user and maintenance functions. The main firmware 110 interfaces with the Flash Data Storage (FDS) 109 to retrieve variables saved in Flash to prevent loss during a power reset. The main firmware 110 uses the main look up table section of Flash memory 111 for hard coded values or items too complex to calculate quickly. The main firmware 110 uses the RAM 114 to store working variables. The main firmware 110 also accesses the factory information section (Flash) 106 to report factory information to the user. The main firmware 110 uses the SoftDevice (SD) 112 to decode wireless data packets 115, containing user commands to further control the hardware, further described in FIG. 16. These data packets are produced by the smart device or standalone controller 116, initiated by the human input 103, for example. The main firmware 110 will continue looping within itself, unless it gets a command to enter the power off state 101 or the bootloader 107. The SoftDevice (SD) 112 has its own dedicated RAM section 113, which stores BLE stack variables. The firmware is packaged to operate in a number of different configurations depending upon hardware options that are enabled or disabled, based on a price point of the commercial products.

FIG. 2 is the detailed description of the firmware bootloader. When the bootloader starts from an off state 101, it first initializes power controls 201. The power controls 201 are responsible for latching the system in the on state, as well as for monitoring battery and PCB temperature. A watch dog timer is also initialized at this stage, which is responsible for resetting the system in case of a CPU error or halt. The clocks are then initialized in block 202. The clocks include a millisecond and microsecond timer, used for time calculation, as well as non-blocking loops. LEDs are then initialized in block 203. In other example embodiments of the invention, displays and other color changing output hardware (not shown separately) is initialized in block 203. The LEDs are responsible for generating the visual output to the user. Examples of the LEDs are either in the form of SPI or WS2812 data stream. Other example embodiments of the invention use other types of data streams to control the LEDs and other color changing output hardware, such as PWM, WS style strips, I$^2$C, and analog strips. The bootloader then checks if it was triggered because of a firmware update in block 204. If a firmware update was triggered, the process continues to firmware update loop 212. Otherwise, the bootloader checks whether a charging mode was triggered 205. Charging mode triggers occur when an external charging source is detected. If a charging mode was triggered, the process will then enter a dedicated charging mode loop 213, which is not released until the charging source is removed. If no charging source is found, the bootloader initializes the battery fuel gauge (LiPo Fuel Gauge) 206. The bootloader then enters a power switch check loop 207. This loop uses the length of time of the power switch press to determine which power mode is entered. The power modes are determined in block 208 and include battery level display, power on, and reset. When the length of time for the battery level display elapses, the system displays the battery level 209. When the length of time for the power on mode elapses, the system displays red LEDs 2081 to signify the power on mode has been entered, and then the system un-initializes all interrupt vectors and starts the main firmware in block 210. When the length of time for the reset mode elapses, the bootloader process displays blue LEDs 2082 to display that the reset mode has been entered, and then proceeds to reset the FDS (reference numeral 109 in FIG. 1) user storage location to factory default 211. In one example embodiment of the invention, the battery level display 209 uses a combination of green and yellow LEDs to display the percentage of battery charge, after which the bootloader powers off the device. In power on mode, previously initialized items, as well as interrupt vectors, are uninitialized and the main firmware 110 is then started 210. In step 211 the FDS user locations 109 are reset to factory defaults, and then powers off the device.

FIG. 3 is the main firmware outline, which is started from the bootloader 107 and proceeds to initialize the power controls 301. The power controls are responsible for latching the system in the on state, as well as for monitoring battery and PCB temperature. The watch dog timer is also initialized at this stage, which is responsible for resetting the system in case of a CPU error or halt. The clocks are then initialized in block 302. The clocks include a millisecond and microsecond timer, used for time calculation, as well as non-blocking loops. LEDs are then initialized in block 303. The LEDs are responsible for generating a visual output to the user. In some example embodiments of the invention, these LEDs are either in the form of SPI or WS2812 data streams. Other example embodiments of the invention use other types of data streams to control the LEDs and other color changing output hardware, such as PWM, WS style strips, I2C, and analog strips. The random number generator is then initialized in block 304. The random number generator is used for generating a random code for the setup code, as well as for some special effects. The battery fuel gauge 305 and the FDS 306 are then initialized. The FDS (block 109 in FIG. 1) is then polled to see if this is the first time the device has been powered on. If this is the first time the device has been powered on, and setup is not completed in block 307, then a setup loop is then entered in block 312. The setup loop is further described in FIG. 4. If setup is complete, Bluetooth services are initialized in block 308. These services include, for example, a device information service, a system command service, and an LED ring control service (which also handles fiber optic controls). Bluetooth advertisement and connection services are then started in block 309. These advertisements are in the form of Bluetooth wireless data packets 314. They are sent to the smart device or standalone controller Bluetooth stack for processing in block 313. All external sensors, which include, for example, a vibration sensor, an ambient light sensor, a PDM microphone, and a Hall effect sensor, are initiated in block 310. The main loop is then started in block 311 and continues looping until the system is powered off or another exit command is received. This main loop is further described in FIG. 5. The smart device/standalone controller 313 sends update commands to the firmware, via wireless data packets in block 314, which are received by the SoC on board Bluetooth stack, and trigger a Bluetooth update interrupt 315. The Bluetooth update interrupt 315 updates control values 316, for example, by reference, which affects the values in the main loop 311. This firmware procedure described above and with relation to FIG. 3 is how a user controls the firmware.

FIG. 4 is the firmware setup loop, which is started from block 312 in FIG. 3, when setup is needed. The Bluetooth services, including the setup service, is initialized in block 401. The FDS 109 then erases the Flash setup location in block 402. The random numbers for Bluetooth pairing are generated, and the LEDs displaying colors matching these numbers are turned on in block 403. Bluetooth advertisement and connection services are then started in block 404. These advertisements are in the form of Bluetooth wireless data packets 419, for example. They are sent to the smart device or standalone controller Bluetooth stack for processing in 418. The loop that checks whether the setup is completed is then started in block 405. If setup is complete, Bluetooth services are reinitialized 406. These services include, for example, a device information service, a system command service, and an LED ring control service (which also handles fiber optic controls). After initialization, Bluetooth advertisement and connection services are then started in block 407. External sensors, which include, for example, a vibration sensor, an ambient light sensor, PDM microphone, and a Hall effect sensor, are initiated in block 408. The main loop is then started in block 409 and continues looping until the system is powered off or another exit command is received. This main loop is further described in FIG. 5.

If setup is not complete in block 405, the charging mode is checked in block 410. If a charging source is detected, then block 411 begins with un-initializing all interrupt vectors and enters the bootloader sequence. If a charging source is not detected in block 410, battery temperature is then checked in block 412. If the battery is too hot, the firmware setup loop proceeds to block 413, displays an error, and powers off the device. If the battery temperature is acceptable, the process continues from block 412 to block 414, where the power switch state is checked. If the power switch is in an off state, the process continues to block 415, the power off message is displayed, and the device powers off. If the power switch is not in an off state in block 414, the process continues to block 416, where the system checks to see if any commands have been received. These commands come from many sources including, for example, a number of LEDs in the device, a device/embodiment type, name, and a pin. These commands are processed and saved in block 417, at which point the check setup loop restarts. The smart device/standalone controller 418 sends setup commands to the firmware, via wireless data packets 419, which are received by the SoC on board Bluetooth stack, and trigger a Bluetooth update interrupt in block 420. The Bluetooth update interrupt 420 updates control values in block 421, including by reference, which affect the values in the setup loop commands that are checked in block 416. This firmware setup loop procedure is how the user sets up the firmware the first time the device is turned on.

FIG. 5 shows the main process loop of the main firmware. First, the charging mode is checked in block 501. If a charging source is detected, then the process continues to block 502 and un-initializes interrupt vectors and enters the bootloader process (see FIG. 2). If a charging source is not detected, the process continues to block 503, where battery temperature is then checked. If the battery is too hot, the process moves to block 504 and an error signal is displayed, and the device is powered off. If the battery is not too hot, the process continues to block 505, and the power switch state is checked. Checking the power switch in block 505 also gives the user the ability to select a limited number of options for the fiber optic fabric (reference numeral 2140 in FIG. 21) and the ring (reference numeral 2130 in FIG. 21), without the use of a smart device or standalone controller.

If the power switch is in an off state, the power off message is displayed, and the device powers off as shown in block 506. If the power switch is in a button pressed state, the process continues to block 507, and the main firmware process advances through the modes or color change selectors available to the firmware. The process pauses on a mode that requires a color input and loops through the possible list of defined colors stored in the main look up table (see reference numeral 111 in FIG. 1) before proceeding to the next mode. Advancing in this fashion shown in block 507 allows a user to access all modes with a limited set of color options without the need of a smart device or standalone controller. While this does not allow for as many color options or other mode options allowed using the standalone controller or a smart device, it does give the user a quick option to customize their color changer. In some example embodiments, the fashion shown in Block 507 for selecting modes and colors is used to control both the ring, 2130, and the fiber optic portion, 2140, independently. Color change selectors can be used to select effects, which are included as modes below. Sensor-based color change selectors, such as, for example, a color detector, an accelerometer, a vibration sensor, a Hall effect sensor, a motion sensor, and a microphone can also be used as color change selectors.

The process continues to block 508 as the ambient light sensor 1660 (shown in FIG. 16) is then polled, and a brightness value is saved into RAM (reference numeral 114 in FIG. 1). The main run mode section is then entered in block 509. This (main run mode) section is responsible for running the effects and possible user modes on the device. Some of these modes include, for example, any solid color in the RGB color space, rainbow effects, multiple types of looping effects, camera color detection, audio triggered color changes, vibration step/bounce, triggered color changes, sparkly color changes, individual pixel modes, sequence modes, mood modes, pet modes, persistence of vision mode (POV), as well as many other modes. Next, the LEDs are updated in block 510. This update sends the SPI (reference numeral 1643 in FIG. 16) and/or the WS2812 (1644 in FIG. 16) data to the LED strips. This update includes the WS2812 data 1644 for the fiber optic fabric 2140 high power LED controller (e.g., part of reference numeral 2110 in FIG. 21) attached to the end of the LED ring (reference numeral 2130 in FIG. 21). At this point, the loop then repeats until a power off or other user exit command is entered.

The persistence-of-vision mode outlined above is used to display images on rotating embodiments of the invention, such as a bike tire. This mode operates by using the Input from Sensor (reference numeral 1603 in FIG. 16), to determine when a new tire rotation occurs, as well as the length of time one rotation takes (in microseconds). In the persistence-of-vision example embodiment, the Input from Sensor (reference numeral 1603 in FIG. 16) is from a Hall effect sensor. In other example embodiments, Input from Sensor 1603 gets its input from other sensors, such as for example, vibration sensors, IR motion sensors, and accelerometers. The rotation time is then used to calculate the amount of time one-degree section/slice is to be kept on. Using the persistence of vision phenomena, all slices appear to be on at the same time, displaying a complete image to the user.

The firmware update section is part of the bootloader process (FIG. 2). The firmware update section (reference numeral 212 in FIG. 2) allows the user, through the app, to install a new bootloader, SD (SoftDevice), and/or main firmware into the Flash memory of the microcontroller (reference numeral 1608 in FIG. 16). This update is done over BLE and has fail safes to prevent bricking the chip in case of a failed update. These fail safes include, for example, not over writing the firmware update section or SD (SoftDevice) in Flash memory until the update is saved to memory and confirmed, never deleting the MBR section, and restricting user flash resets until all updates are confirmed.

Smart Device Apo

One example smart device app, in an embodiment of the invention, is written for the Android operating system. The app is ported to the other common operating systems including iOS, Windows OS, and other operating systems. In one example embodiment of the invention, the app is written in combination of Java and XML languages, along with SVG image/icon data. FIGS. 6-11 show screen shots of example user screens for the app, based on an Android example embodiment. Other operating systems are used in other example embodiments of the invention and utilize similar user interface layout tools. FIGS. 12-15 show example code flow diagrams of the back-end code of the app. The app is the user interface to control the color changer firmware and hardware. The app may be replaced with a standalone controller as well. Other example embodiments of the app, in accordance with the invention may use different UI layouts and background functions to produce this effect.

FIGS. 6-11 show an example of UI screens of the invention implemented with an Android app embodiment of the invention. iOS and other app embodiments, in accordance with the invention, look similar and use UI layout tools associated with the specific operating system for which the invention is implemented. Underlying background code and operating system specific algorithms used to create the screens in other embodiments of the invention using different operating systems may use functions native to the operating system for which they are designed with minor variations. In an Android embodiment of the invention, parts of the UI screens discussed in FIGS. 6-11 are considered "fragments" attached to activities, according to the way the Android operating system defines life cycles and their ability to refresh portions of the screen to enhance app efficiency. For example, in FIG. 7, each tab on the tab bar 701 switches between different fragments, which are refreshed below the tab bar, but are included as part of the entire activity shown on the screen. The app includes multiple color change selectors that are part of the UI of the smart device that send software instructions to the electronic control unit of the article or device. These color change selectors include, for example, the camera color selector, described in FIG. 6, the software slider bar, described in FIG. 7, the effects and mode selection, described in FIG. 8, the audio selection, described in FIG. 9, the individual pixel selection function, described in FIG. 10, as well as mood, sequence, pattern image and text selection (not shown separately). The color change selectors can also take inputs from hardware on the smart device, such as, for example, the camera to provide a video signal, the microphone or audio files to provide an audio signal, or the accelerometer to provide a force signal.

FIG. 6 is an example of a camera color selection screen of an app in accordance with the invention. The tab bar section 601 of the app is used for switching between different screens within the app and includes different control options. For example, screen 602 is the preview window for the camera. A user options bar 603 includes buttons 631, 632, 633 for changing camera settings. The button used to switch between cameras on the smart device is shown as reference numeral 631, and it allows a user to switch between taking a selfie or other types of photos. Button 632 allows the user to switch between capture modes, as shown regarding reference numeral 604. The capture modes include a fixed position mode, in which capture dot 604 stays stationary while the user moves the camera, and a touch mode, in which capture dot 604 moves to the position that the user touches in a user preview window 602. In the fixed position mode, the color automatically updates as the user moves the camera and is only captured when accept button 605 is pressed. During touch mode, the color is updated and captured when the user touches the camera preview window 602. Flash button 633 allows the user to enable or disable the smart device's flash to illuminate the object they are photographing. The capture dot 604 is used for showing the position of the color being captured. The capture dot 604 changes its color between black and white to stay visible, based on the CCIR601 luma standards. The accept button 605 is the button used to commit the selected color to memory and transmit it, via Bluetooth to the color changer.

FIG. 7 is an example of a color wheel screen portion of an app, in accordance with the invention. The tab bar section, 701, of the app is used for switching between different screens in the app and includes different control options. Ring 702 is the hue section of the HSV color space. Disk 703 is the location the user selected color is displayed. Bar 704 is the bar that the user moves around ring 702 in order to select a hue value for the color. Rectangular area 705 is a two-dimensional gradient showing the saturation and value portions of the HSV color space. Color selection dot 706 is moved around the gradient 705 to select a saturation and value portion for the color. The outline of the color selection dot 706 changes between black and white to stay visible, based on the CCIR601 luma standards. Advanced options are selected by touching advanced options button 707 to open the advanced options drawer 708. The advanced options drawer 708 allows the user to enter a numeric value for the color in RGB, HSV, or Hex color spaces.

FIGS. 8A and 8B show mode selection screens of an app in accordance with the invention. The tab bar 801 section of the app is used for switching between different screens within the app and includes different control options. Seek bar 802 is a bar used for selecting the speed of the effect selected in effect section 803. Options bar 804 is the pull-down options drawer, which includes icons 805-816. Copying button 805 is used for copying settings, such as color, speed, and mode, between devices (represented by device icons 810-813). LED on/off button 806 is used to turn off or on all LEDs without affecting other settings. This feature is used if a user enters a room which requires no light emitting devices, such as a movie theatre, but the user does not want to clear their settings or turn their device off. Save button 807 is used to save or load settings, devices, and other app features. This feature is useful when reinstalling the app, moving to a new smart device, or uploading a shared pattern from another user. Sharing button 808 is the button used for sharing the current device settings with other users, via any communication method the user may choose, including text messages, email, Facebook messenger, airdrop, and other communication methods. Settings button 809 is the button used to open the settings menu activity, further described in FIG. 11. Device icons 810-813 enable the selection of which hardware device the user is controlling. This device selection allows for individual control of devices with pairs or additional features, such as a shoe embodiment of the invention described in FIG. 21. In the example shoe embodiment, Device icon 810 enables individual control of the left shoe LED ring (reference numeral 2130 in FIG. 21), and device icon 813 enables individual control of the right shoe LED ring (reference numeral 2130 in FIG. 21). Device icon 811 enables control of both shoes' LED rings 2130 at the same time. Fiber optic fabric icon 812, in the example shoe embodiment, enables control of the fiber optic fabric (reference numeral 2140 in FIG. 21). Device icons 810 and 813 also include a battery level indicator for both shoes, respectively. Device icons 810, 811, and 813 control the LED strip section of the devices. Device icon 812 controls the fiber optic section of the devices. Brightness slider 816 and check box 814 are a brightness seek bar and an auto brightness check box. The slider 816 enables a user to control overall brightness selected, while the auto brightness check box 814 allows the hardware ambient light sensor (reference numeral 1660 in FIG. 16) to control the overall brightness.

FIGS. 9A and 9B show audio function screens of an app, in accordance with the invention. The tab bar 901 section of the app is used to switch between different screens within the app and includes different control options. Visualizer button 902 is the button used to switch to the visualizer screen (FIG. 9B) from the file list screen (FIG. 9A). Similarly, file button 903 is the button used to switch from the visualizer screen (FIG. 9B) to the file list screen (FIG. 9A). The file list screen (FIG. 9A) displays a list of all playable music files on the device. In one example embodiment of the invention, these files 904 are laid out with album artwork, title, and artist as a list of clickable buttons. The visualizer (FIG. 9B) includes a list of beat detection frequencies as shown with slider bars 907. These frequencies are in a list that enable the user to select a frequency to use as a trigger for LED audio changes. Each frequency also has a sensitivity bar 911, as one example, that enables the user to select the sensitivity in which that frequency detects a beat. There is also a visual indicator 913, for example, showing when each frequency triggers a beat detection. Microphone select button 905 enables the user to enter microphone-based detection mode, which enables the audio source detected to be a smart device's microphone rather than a music file. Internal microphone button 906 enables the use of hardware-based beat detection using the internal PDM microphone (reference numeral 1690 in FIG. 16). This internal PDM microphone beat detection enables the color changer to function with audio detection independently from the app. Media playback controls 908 include play, stop, pause, front, back, playlist, and other audio controls.

FIG. 10 is the individual function screen of an app, in accordance with the invention. The tab bar 1001 is used to switch between different screens within the app and includes different control options. Circle 1002 represents all pixels on the device. Selector 1003 moves around circle 1002 and enables selection of the pixel on the device that is being edited. Option buttons 1004 show the options for each pixel, which include solid colors, rainbow, vibration control, speed, and group settings. The group settings enable multiple pixels to be linked together to the same trigger.

In addition to the pixel controls outlined above, a mood tab is used to give the shoe random moods based on different colors and effects giving the shoe its own persona. The mood tab is also used to enable "pet" mode. Pet mode enables the shoe to display different colors and effects based on its need, with the user opening the app to attend to these needs throughout the day. Another embodiment of the invention includes a mood function that is also used to display the user's mood, where the color of the shoe indicates the supposed mood of the wearer. The mood is either randomly generated or based off of the user's body temperature. In order for the color of the shoe mood to reflect the user's body temperature, sensors are placed in the color changer. Another example embodiment of the invention includes a mood function that allows the color changer to react to weather, surroundings, social media updates, and other information feeds. In another example embodiment of the invention, the color changers are configured to interact with other user's color changers as they pass by or move around each other. In another example embodiment of the invention, sensors are placed in locations on the user's body to measure temperature at those points and to provide temperature information to the shoe hardware to change colors. To ameliorate security concerns, color changers of users that are "friends" are configured to communicate with each other.

A sequence tab (not shown in FIG. 10) enables the user to generate a custom color sequence using controls akin to a timeline. The sequence tab enables the generation of custom effects and patterns and are expanded beyond the options included in a default app.

A preview tab (not shown in FIG. 10) enables the user to see a preview of the color changer device in a 3D viewer. This tab enables a user to experiment with the app before purchasing a color changing device. This tab also generates patterns without being connected to the color changer device, or while the color changing device is charging. In one example embodiment of the invention, in operating this tab, the 3D view functions as a list of rotated images of each device that are scrolled through giving the appearance of a 3D object. These images have SVG built paths overlaid on them to demonstrate the color changes. Another example embodiment of the invention includes a tab that uses other 3D functions and overlays to give the appearance of a 3D object.

A persistence of vision tab (not shown in FIG. 10) enables the user to draw or import graphics for display in the persistence of vision mode. The persistence of vision mode is described in detail in the firmware section of this document.

FIG. 11A is the Bluetooth screen of an example settings menu activity portion of the app in accordance with the invention. The tab bar 1101 of the settings menu is used for switching between different settings screens that include different options and information. Bluetooth on/off switch 1102 turns the smart device's Bluetooth hardware on and off, and also updates the availability of the remaining features in the Bluetooth screen accordingly. The Set Up New Color Changer button 1103 is the button used to open the dialog screen 1170 and is used for adding an existing color changer or setting up a new one. Scan button 1107 of the Bluetooth screen is used to scan for available color changers, as well as connect to them. Connect button 1108 changes to a connection status and disconnect button after an active connection to a color changer has been made. The Connect to Color Changer section 1104 of the Bluetooth screen updates with the color changer name and device information once connected. Check box 1105 is a check box used to have the app automatically turn the smart device's Bluetooth on when the app opens. Bluetooth Menu options area 1106 is a location where additional menu options appear if their requirements are met. These options include connecting to the last color changer on app start, changing the name or pin of the connected color changer, and deleting a previously added color changer from the smart device. Radio button 1171 in FIG. 11B is the radio button used to select a new device or an existing device that is being added. Menu options 1172, 1174, and 1175 appear when new devices are being added. For example, drop down 1172 is used to select the type of device/embodiment being connected to. Button 1173 is used to scan for a device. Drop down 1176 selects the color changer device to connect to from a list of devices found in the scan. If the color changer device (e.g., a pair of shoes) includes a pair of devices, two drop-down menus appear, rather than one for single devices. For new devices, drop down 1176 displays a color pattern, also displayed on the color changer, to allow the user to determine which device they are connecting to. For existing devices, drop down 1176 displays the user customized name for the device. Drop down 1174 allows the user to select the number of LEDs in the ring (reference numeral 2130 in FIG. 21) that the color changer contains. Text boxes 1175 enable the user to input a customized name and pin for the color changer.

The general settings tab and information tab (not shown in FIGS. 11A-11B) include basic functions, described below. Also, the operation of the firmware tab is described below as well.

The general settings tab includes basic settings and commands for the color changing device. A push update button forces a Bluetooth update to occur transferring settings from the UI device to the connected color changer. In one example embodiment of the invention, all settings from the UI device are transferred, as opposed to an incremental Bluetooth update, such as a color update, which sends only the data required to update a particular feature. A power off button gives the user another way to power off the color changer device. A battery saver check box decreases the overall brightness output in order to save power. A battery saver mode can cause the LEDs to be washed out by the sunlight or bright lighting and is not enabled by default. A sync devices checkbox enables color changers that come in pairs, such as for the example shoe embodiment described above, to sync their effects using time of flight calculations for the BLE transmission packets. In another example embodiment of the invention, the effects are synchronized using other methods, for example, Bluetooth dual thread process syncing, hard coded time delay syncing, or central/peripheral shoe to shoe communication syncing. A vibration sensitivity seek bar and default checkbox are used to select sensitivity for the vibration sensor 1603. The general settings tab also includes checkboxes to enable the color changer device to react to incoming phone calls or text messages on the smart devices.

The information settings tab shows the connected color changers' manufacturer name and date, serial number, hardware version number, and version numbers for all firmware sections. The firmware sections include the bootloader, the SD, and main firmware. The information settings tab also includes a list of credits as well as copyright information.

The firmware tab is used to copy new firmware from the smart device to the color changer hardware. This tab verifies that the new firmware the user is trying to copy is compatible with the hardware version, as well as the version of other firmware sections. The firmware tab searches for new firmware that is available on the company website, downloads it to the smart device, and presents it to the user for upload. Once the user clicks the upload button within the firmware tab, the app initializes a background task that will block the app from further function until it returns through either a failed update or a verified completed update. If the update fails, the firmware tab presents the user with the option to retry the update.

FIG. 12 is a flowchart of a main process flow of an example app, in accordance with the invention. The app starts by loading its default or saved state in block 1201. A user is then presented with the main activity, which includes a function tab selection or function pull down menu in block 1203. The user, in block 1202 makes touch selections on the screen to control the app. The user can choose to select an item within a pair or location setting following block 1206. A change can also be made in the pull-down menu following block 1205. When a change is made in the pull-down menu in block 1205, the background run operations start in block 1209, and a Bluetooth update is posted in block 1216, if necessary. Changes can also be made in the main tab bar in block 1207, which brings up the appropriate screens for that particular tab selection. Screens include, for example, color change 1210, mode/effect change 1211, and audio change 1221. Other screens 1212 include individual function, sequence function, mood function, and preview function. Changes that occur in the screens 1210, 1211, 1221, and 1212, post a Bluetooth update 1216 if required. The audio change screen 1221 starts the Fast Fourier Transform FFT in the background 1220, as well as the audio streaming content controller 1219, which updates the lock screen and notifications. Audio changes in block 1221 also create a service change in block 1215. If the settings menu button, 1204 is selected from the pull-down menu in block 1205, the settings menu activity is started. Selections made on the settings menu tab bar in block 1208 display different settings screens or portions of screens. These screens include the Bluetooth settings screen (FIG. 11), the general settings screen, the firmware screen, and the information screen. If the Bluetooth connection state changes in block 1213 from the Bluetooth settings screens (FIG. 11), a Bluetooth update in block 1216 is triggered, if necessary, and a service change is made in block 1215. Other changes within tabs are made in block 1214, which can also trigger Bluetooth updates in block 1216 if necessary. All Bluetooth updates in block 1216 are converted to wireless Bluetooth data packets in block 1217, which are received by the color changer device hardware shown in block 1218. The color changer device hardware in block 1218 also posts wireless Bluetooth data packets in block 1217 to the smart device Bluetooth update handler in block 1222. Some of these updates can include battery status, setup information, and device information. Service changes in block 1215 are changes that occur to the background service for the app.

FIG. 13 shows the flow for the camera functions for the camera screen in FIG. 6. The user in block 1302 switches to the camera tab in block 1301 on the app tab bar (reference numeral 601 in FIG. 6), which displays the camera screen (FIG. 6). Background camera tasks then start in block 1320, and the camera preview in block 1303 begins processing. The camera preview is converted for screen rotation in block 1309 and proper scaling in block 1310 before being displayed as shown in FIG. 6. Conversions in block 1309 and in block 1310 are based off of screen size, camera hardware orientation, preview size, and camera output size. Conversions are done using GPU or matrix transformation. Other example embodiments of the invention use other conversion methods, for example, open GL processing. The color selection method in block 1304 is chosen using camera selection button 632. Updates in block 1305 are made to the color selection dot (604 in FIG. 6) and the color selection button (605 in FIG. 6). Depending on the type of color selection method selected in block 1304, a bitmap of the surface texture is generated in block 1307 from the camera preview (602 in FIG. 6). Pixel data in block 1308 is then gathered from the color selection dot location (604 in FIG. 6). The user in block 1302 then confirms the selected color in block 1306 via the button (605 in FIG. 6). Once this selection is made, updates are sent to the Bluetooth handler and other app functions in block 1311. The user in block 1302 also has the option of turning the light for the camera on or off in block 1312.

FIGS. 14A-14D show four related Bluetooth background functions (processes) for an example app, in accordance with the invention, and also shows how a Bluetooth handler works. The four processes FIGS. 14A-14D are part of the same Class, and they access the same private variables, and their functions are stored on the same file. FIGS. 14A-14D also shows how the Bluetooth functions interact with an app background service. A Bluetooth scan for previously configured devices in block 1402 is first started from the Bluetooth scan button (for example, reference numeral 1107 in FIG. 11A). If the device has been previously configured, then user 1401 selects the device in block 1403, via 1104 in FIG. 11A. If the device selected in block 1403 is a new device, then setup is entered in block 1404, via the setup window (reference numeral 1170 in FIG. 11B), which is triggered by pressing the setup new color changer button (reference numeral 1103 in FIG. 11A). After the device has been set up, or if the device has been previously configured, the process moves to block 1405, where a Bluetooth connection is started. After the connection has been started, the background service is checked for an active status in block 1406. If the service is not active, a new service is started as a foreground service with notifications in block 1407. After the service has been started, or if it has already been started, the process moves to block 1408 where a Bluetooth thread is created and attached to the service. Then, the initial update is pushed to the color changer hardware in block 1409.

As shown in FIG. 14B, when the user provides human input 1410 to change settings or data in the app that requires a Bluetooth update, a first in, first out procedure begins in block 1411. This first in, first out (FIFO) procedure starts by looping, while checking a semaphore write lock in block 1412. Once the semaphore becomes available, it is relocked in block 1413 before writing new data in block 1414. After the data write completes, the background functions wait for a write callback in block 1415 before unlocking the write semaphore in block 1416, after a callback from the color changer is posted. Data is written in block 1414 by using Bluetooth characteristics and custom UUIDs.

If a color changer notification is sent in block 1417, such as, for example, a battery status update, the Bluetooth background functions first decode the UUID in block 1418. The Bluetooth background functions then determine where this UUID post belongs in block 1419, before posting the update to the user interface in block 1420. If the user in block 1421 decides to disconnect from the color changer in block 1422, via reference numeral 1104 in FIG. 11A, first the Bluetooth thread is stopped and detached from the service in block 1423. The service is then polled to see if it has other threads running in block 1424. If it does, the function exits, and the service continues to run in the background in its own process as shown in block 1426. Otherwise, the service is stopped and notifications are cancelled in block 1425.

FIGS. 15A and 15B illustrate audio background functions for an app, in accordance with the invention, and also show how audio FFT (Fast Fourier Transform) handlers work. FIG. 15A also shows how audio functions interact with an app background service, in accordance with the invention. The user provides human input in block 1501 and starts an audio tab in block 1502. One example embodiment of the invention starts an audio tab, such as that described with regard to FIG. 9A above, via the app tab selection bar (reference numeral 901 in FIG. 9A). The user 1501 selects an audio mode in block 1503, which includes, software microphones, audio file playbacks, hardware microphones, and other audio modes. If a hardware microphone is selected, in block 1503, the command for audio functions to be handled by the firmware (FIG. 1 for example) is sent in block 1504. In one example embodiment of the invention, an internal Pulse Density Modulation (PDM) microphone (see reference numeral 1690 in FIG. 16) is used as the hardware microphone. If software microphone mode is chosen in block 1503, the process continues to block 1505, and the smart device's microphone is then used. The process for using the software microphone is to first check if the background service is active in block 1506. If the background service is not active, the process continues to block 1507, where a new service is started as a foreground service with notifications. After the service has been started, or if the service is already active, the process continues to block 1508, where a microphone audio thread is created and attached to the service. Then, the microphone is started, and a notification is posted in block 1509 before posting and decoding FFT data in block 1517.

If audio playback mode is chosen in block 1503, an audio file list is generated in block 1510, and the user is prompted and provides input in block 1511 to select a file to play or create a playlist as shown in block 1512 (for example, via files as in 904 in FIG. 9A). Then, a check to see if the background service is active is performed in block 1513. If the background service is not active, a new service is started as a foreground service with notifications in block 1514. After the service has been started, or if the service is already active, a media audio thread is created in block 1515 and attached to the service. Then, the audio playback is started, and a notification is posted in block 1516 before posting and decoding FFT data in block 1517.

The user provides input in block 1518 to select a frequency range to use in block 1519 and a sensitivity for this frequency in block 1520, (for example, via visualizer 907) (shown in FIG. 9B). Peak detection based on the frequency range and sensitivity is then started in block 1521. When a peak detection occurs in block 1521, an update is sent to the Bluetooth handler and other app functions in block 1522.

As shown in FIG. 15B, if media playback ends, pause times out, or if the user provides input to the media controls (see reference numeral 908 in FIG. 9B) or notifications menu media controls (not shown separately) in block 1523, then a response to the user input is handled in block 1524, the media is stopped in block 1525, or microphone capture is ended in block 1525. The appropriate audio thread is stopped and detached from the background service in block 1526. The service is then polled to see if it has other threads running in block 1527. If other threads are running, the function exits and leaves the service running in block 1529, otherwise, the service is stopped, and notifications are cancelled in block 1528.

Hardware Configuration

In one example embodiment of the invention, hardware includes four different printed circuit boards (PCBs). Using this example embodiment of the invention in FIG. 16 to further illustrate features of the invention, the PCBs include, a main PCB 1601, a User I/O PCB 1680, an ambient light sensor PCB 1660, and a PDM microphone PCB 1690. In other example embodiments of the invention, other configurations of the hardware are used, but for simplicity and brevity, the example below describes features of the invention as using four PCBs.

In another example embodiment of the invention, the main PCB 1601, is made smaller by increasing the number of layers, moving the BLE antenna 1607 to an external antenna, using smaller integrated circuit packages, and splitting the PCB into different functions through breakaway tabs. By using breakaway tabs, the manufacturer can choose to leave out certain features requiring less components and making the PCB smaller and less expensive. Without using breakaway tabs, component blocks, such as for example, wireless charging, battery fuel gauge, and parts of the power management logic, can be left off the PCB during the manufacturing process and disabled in firmware (for example FIG. 1) to limit features, use less components, and lower the cost while keeping the PCB the same size. In another example embodiment, component blocks, such as for example, wireless charging, battery fuel gauge, and parts of the power management logic, are removed from the PCB layout and disabled in firmware (for example FIG. 1) to limit features, use less components, and lower the cost while making the PCB smaller. Another example embodiment of the invention uses a multi-layer PCB in order to reduce the size. A custom lithium ion battery 1633 is used to match the size of different embodiments of the invention. Also, in other embodiments of the invention, a custom lithium battery is used to supply 7.4 Volts rather than 3.7 Volts to the system, which removes the need for the boost circuit 1616, in turn shrinking the size of the PCB and lowering integrated circuit costs. The lithium ion battery 1633 can be replaced by a solid-state battery or a battery with a solid lithium electrode and plastic electrolyte to create a smaller, safer, and more energy dense power source. To facilitate FCC approval, further electromagnetic/radio frequency interference shielding can be added in the form of a metal cover, EMI shield tape, or other shielding materials, connected to ground, over the PCB. In another example embodiment of the invention, FCC approval is facilitated by using a system in package module, which would include the microcontroller, antenna, and other passive components in an FCC preapproved package that would replace the components on board counter parts. In another example embodiment, FCC approval is facilitated by using a drop in PCB module (for example, the Raytec Corporation module), which would include a microcontroller, antenna, and other passive components on an FCC preapproved PCB that would replace the components on board counter parts.

FIG. 16 shows a general signal flow of hardware in a color changer device, in one example embodiment of the invention. This hardware runs the firmware (for example, the firmware shown in FIG. 1), on a processor, such as microcontroller 1608, and converts user inputs 1610 from the smart device or standalone controller in block 1620 into lighting outputs, such as LED light strip SPI 1643 and LED light strip WS2812 data 1644. In this example embodiment, an IC (microcontroller) contains a low power microprocessor, as well as peripherals to run the microprocessor, such as, for example, RAM, Flash, and GPIO registers etc. In other example embodiments of the invention, the microcontroller 1608 has 2 microprocessors, as well as the other peripherals to ensure proper operation. In these example embodiments, often one microprocessor is dedicated to wireless communication and the other is dedicated to GPIO and other peripheral functions. In another example embodiment of the invention, separate ICs are used to achieve this separation of wireless communication and other peripheral functions. In another example embodiment of the invention, a microprocessor is included and peripheral functions, for example, Flash, RAM, and GPIO are separate external ICs. Some manufacturers use the word microcontroller and microprocessor interchangeably to describe these types of configurations described above. The main PCB 1601 includes integrated circuits and other electronics to make the color changer device function, as shown in an example shoe embodiment of the invention shown in FIG. 21 (reference numeral 2110). The hardware stack-up and layout of one example of the main board 1601 are shown further as an example in FIG. 17 and in FIG. 18. Microcontroller 1608 runs and controls processing signals, including those of firmware (FIG. 1 for example). One example embodiment of the invention uses an integrated circuit for the microcontroller 1608 based on the NRF52832, but the invention is not limited to this device as other similar integrated circuits (ICs) can be used. The NRF52832 was chosen for this example embodiment of the invention based on its low energy consumption, Bluetooth low energy SoC features, and multiple peripheral hardware devices. In other example embodiments of this invention, integrated circuits that use Classic Bluetooth, other wireless communication protocols, and external hardware peripherals are used. Further, other example embodiments of this invention use self-contained drop in modules that have all control and wireless features built in. The microcontroller 1608 is fed by both a low frequency 32.768 kHz clock 1602 and a high frequency 32 MHz clock 1604 for this example embodiment. The low frequency clock may be removed, and an internal RC oscillator can be used to conserve PCB space, but this can lead to less accurate Bluetooth low energy and hardware peripheral timing, and a final configuration can be determined based upon the hardware peripheral timing requirements. In another example embodiment of the invention, clock frequency and types (low/high frequency) are chosen based on the specific integrated circuit or method carried out by the microcontroller 1608. Further, another example embodiment of the invention uses a programmable clock generator IC or other compatible timing method. Battery assembly 1631 is attached to the bottom of the main PCB 1601. The battery assembly 1631 includes a 3.7 V lithium polymer battery 1633, a battery temperature sensor 1632, and a Qi wireless receiving coil 1634. The lithium polymer battery 1633 ranges between 500 mAh capacity to 10,000 mAh, depending on the embodiment of the invention and the LED current consumption needs. Further, another example embodiment of the invention uses a ceramic lithium battery, which improves flexibility, package style, and safety. Another example embodiment of the invention uses a solid state or plastic polymer battery, which is more energy efficient and safer. The battery temperature sensor 1632 is an NTC temperature sensor, which is read by microcontroller 1608, via the Successive Approximation Analog-to-Digital Converter (SAADC) peripheral. Another example embodiment uses external components to replace the SAADC using other analog to digital convertors. Further, another example embodiment uses digital temperature sensors or other temperature reading devices. Another example embodiment uses a battery that contains an internal temperature sensor. The Qi receiving coil 1634 has its inductance selected and tuned based on the embodiment in which the invention is used (e.g., a shoe, an article of clothing, etc.). For example, Qi charging components may have different external designs depending on the article it is being used to charge. One example embodiment of the invention in a color changing shoe uses a Qi pad with a charging coil for each shoe, whereas an example embodiment of the invention in a color changing beach ball uses a single charging coil. In an example embodiment of the invention, one Qi charging pad includes a gray scale or black only ink display, that changes depending on the type and size of the color changer being charged. The Qi charging pad creates dynamic alignment markers with little user interaction, instead of a user manually changing an overlay sheet for alignment of the charging coils on the color changer device and the charging pad. In some example embodiments of the invention, a magnetic charging connection is used in place of a Qi charging coil. In another example embodiment of the invention, a battery with a built-in Qi charging coil or complete Qi charging system is used. Another example embodiment uses other wireless charging standards and designs for wireless charging, such as, for example, non-Qi inductive charging designs. Another example embodiment of the invention uses a kinetic power source to power the device and recharge the battery while the device is in motion. This kinetic charging is achieved through the use of piezo electrics, electromagnetics, or other kinetic chargers, and works with color changers that use relatively low current consumption for their optical output operations.

The battery 1633 has its state of charge monitored by the LiPo fuel gauge 1615, which is read by the microcontroller 1608, via $I^2C$/TWI. Another example embodiment uses other fuel gauges or other methods of battery level metering, such as, for example, Coulomb counting, voltage vs capacity curve methods, or load vs. rest sensing methods. These other example embodiments use other communication protocols, such as, for example, SPI, serial, parallel, and analog to communicate with the fuel gauges. The battery 1633 is charged, via a dedicated LiPo integrated charging circuit 1619, which protects the battery from overcharge, over voltage, over discharge, under voltage, and controls the charging process. Another example embodiment of the invention uses other dedicated integrated circuits to match the battery chemistry used. Further, another example embodiment of the invention uses discrete components rather than a dedicated integrated circuit in order to charge the battery.

The Qi receiving circuit 1622 gives power to the LiPo charger 1619 and the power management logic 1614 when it is enabled. The Qi receiving circuit 1622 receives the wireless Qi charging signals 1650 from the Qi charger 1640, via the Qi receiving coil 1634. The user can also supply power to the LiPo charger 1619 and the power management logic 1614 during charging from the USB power adaptor 1630, further described in FIG. 20, via the mini USB port 1682. Another example embodiment uses another style of USB connector or other connectors, such as, for example, barrel jacks or Molex connectors with or without NFC verification to supply power to the LiPo charger 1619 and the power management logic 1614. Charging functions are controlled through the microcontroller 1608, via the power management logic 1614, via the charging logic 1621. The charging logic 1621 sets the current limit for battery charging, switches between charging sources, and disables charging if the battery overheats. Another example embodiment of the invention simplifies the charging logic 1621 by selecting the charging current and charging source at the time of manufacture if wireless charging is not included on the PCB. The boost circuit 1616 converts the power from the battery 1633 from 3.7V to the 5V used for the LED strips. Power control functions, voltage regulation, power filtering, and power distribution is handled by the power management logic 1614.

The input from the sensors 1603 connects to the microcontroller 1608, via the general-purpose input and output task and events hardware (not shown separately). The input from the sensors 1603 can be an analog vibration sensor, piezo electric vibration sensor, a motion sensor, a Hall effect sensor, and other input sensors. Some example embodiments of the invention do not include this sensor. For example, the baseball cap embodiment of the invention does not include this sensor, whereas the shoe embodiment example of the invention includes an analog vibration, and the bike embodiment example of the invention includes a Hall effect sensor. In the case of the example shoe embodiment, the analog vibration sensor is used to detect steps. Different variations of the analog vibration sensor, with varying sensitivities, are used depending on the sensitivity desired. In one bike embodiment example, the Hall effect sensor is used to trigger when a tire rotation occurs, as well as used to measure the duration of a tire rotation. The ambient light sensor (Photo Transistor, for example) PCB 1660 is used to adjust the overall brightness, based on the ambient light. It is read by the microcontroller 1608 via the SAADC. The ambient sensor 1660 is not included in all embodiments of the invention. Another embodiment of the invention uses a digital light sensor or other light detection method, such as, for example, an LDR (light dependent resistor), photo diode, or IC style analog light sensor.

The LED strips 1643 and 1644 are buffered by non-inverting buffers 1611. The buffers 1611 convert the SPI or WS2812 data 1609 from the 3.3V from the microcontroller 1608 to 5V. Other time sensitive embodiments of the invention, such as persistence-of-vision embodiments, do not use the WS2812 type LED strip 1644 (e.g., as shown in the shoe embodiment 2130 in FIG. 21). For example, embodiments which include fiber optic fabric, (e.g., as shown in the shoe embodiment 2140 in FIG. 21), the high current WS2812 LED control circuit is attached to the output of the last LED in the WS2812 LED strip, as shown in the example shoe embodiment 2130. For other embodiments of the invention, such as a bike embodiment, which uses faster LED update times, a serial peripheral interface (SPI) hardware peripheral of the microcontroller 1608 is used to control an SPI style LED strip 1643. The SPI LED strip 1643 can produce a faster update time, as it contains a dedicated clock and data line, whereas the WS2812 only includes a timed data line. Another example embodiment uses other types of LEDs, such as, for example, PWM input strips, Through Hole LEDs strung together, or SMD LEDs strung together.

Some example embodiments of the invention include an internal PDM microphone 1690 for audio detection mode. This microphone 1690 connects to the microcontroller 1608 via the PDM peripheral 1612. The PDM data is then processed by the microcontroller 1608 and converted into FFT data in the audio detection mode. Another example embodiment of the invention uses another style of microphone and corresponding audio data, such as, for example, analog microphones (Electret or Mems), $I^2S$ microphones, or Transducer microphones. Further, another embodiment of the invention uses other audio processing algorithms.

The PCB based Bluetooth antenna 1607 is connected to the microcontroller 1608 and receives and transmits wireless Bluetooth data packets 1693. The Bluetooth data packets 1693 are sent and received from the smart device or standalone controller 1620 in response to user input 1610. To save cost, the Bluetooth antenna is etched on the PCB, but on other example embodiments of the invention, the PCB antenna is replaced by another type of antenna.

The Universal Asynchronous Receiver/Transmitter (UART) peripheral 1618 of the microcontroller 1608 is used for communication with the USB power adaptor 1630 via the mini USB port 1682. The communication with the USB power adaptor 1630 verifies a valid charging source is being used to charge the device. Another example embodiment of the invention uses other methods of charger verification, such as, for example, resistor value verification, $I^2C$, SPI, NFC, and wireless communication methods.

The Serial Wire Debug (SWD) port 1606 of the microcontroller 1608 is used for uploading firmware to the microcontroller 1608. The SWD port 1606 is used during initial factory programming or during debugging. During factory programming, the SWD 1606 is connected directly to the SWD programmer 1670 via the PCB programming header 1605. During debugging, the SWD port 1606 is connected to the SWD programmer 1670 via the mini USB port 1682. In order to enable programming through the mini USB port 1682, the external programming enable pin 1613 on the PCB is soldered closed, which enables a set of buffers to allow the mini USB port 1682 to share the UART 1618 and SWD 1606 ports. Another example embodiment of the invention uses other programming methods, such as, for example, UART, ISP/ICSP/ICP, or Over-Air programming.

The user 1610 presses the momentary button 1681 in order to power on, power off, and send mode change (or color change selector) commands to the microcontroller 1608. The user button 1681 is connected to the microcontroller 1608 via a GPIO port. Both the momentary button 1681 and the mini USB port 1682 are on the user I/O assembly PCB 1680, also shown in the shoe embodiment 2120. Another example embodiment of the invention uses capacitive or resistive touch switches for the user input (shown as reference numeral 1681). Further, another example embodiment of the invention uses other inputs, such as, for example, membrane switches, proximity sensors, or tact switches for the user input (shown as reference numeral 1681). The Qi charger 1640 generates the Qi wireless signals 1650 received by the Qi receiving coil 1634. Both the Qi charger 1640 and the USB power adaptor 1630 utilize an AC power source 1635. In other example embodiments of the invention, the AC power source 1635 is replaced by a battery, solar charger, generator, or other DC power source.

FIG. 17 shows the general hardware stack-up from a side view. One example embodiment of the invention includes the main PCB assembly 1601 as shown in FIG. 16. SMD parts 1721 are shown, as well as the connections 1723 and wiring locations 1708 for connections to the user I/O assembly PCB 1680, the PDM microphone PCB 1690, the ambient light sensor PCB 1660, the Qi receiving coil 1634, and the LED strips 1643 and 1644. FIG. 17 shows the location of the inductor 1722 for the boost circuit 1616 and the vibration sensor 1603. Also shown in FIG. 17 is the double-sided PCB 1702 used in one example embodiment of the invention, which is replaced by a multilayer PCB to save space in other example embodiments of the invention. Another example embodiment of the invention uses breakaway tabs to save space, as previously discussed in this document. Polyimide and double-sided tapes 1703 and 1705 hold parts of the hardware stack up, as well as provide electrical and heat insulation. Another example embodiment of the invention uses other tapes, insulators, glues, or adhesives to hold and insulate the parts of the hardware stack up. The battery 1633 and the battery temperature sensor 1632 are shown in FIG. 17 using reference numeral 1704. The Qi receiving coil 1634 is shown positioned as reference numeral 1707. Copper foil (or other shielding material) 1706 and other EMI/RFI shielding is used as an electromagnetic and radio frequency interference shield to prevent Qi wireless signals 1650 from affecting the rest of the device. Epoxy encapsulation 1701 protects electronic parts from physical damage, as well as insulates and waterproofs them. Another example embodiment of the invention uses other forms of encapsulation 1701. Further, another example embodiment of the invention uses a plastic (or similar) shell rather than total encapsulation 1701, depending on the usage requirements of the stack-up. Removeable mold 1709 is used during manufacturing to create the shape of the epoxy encapsulation 1701. The mold 1709 is made out of a variety of different materials including Lexan, 3D printed filament, and/or injection molded plastics. In another example embodiment of the invention, the mold 1709 is made out of other materials, such as, for example, metal or clay molds.

FIG. 18 shows general locations of integrated circuits and an example layout of different component and circuit locations of the front and back of a main PCB 1601 in one example embodiment of the invention. This example layout can be modified or changed depending on PCB space requirements and the number of layers of the PCB used in a particular example embodiment of the invention. In the example embodiment shown in FIG. 18A, the main PCB front 1801 includes a Bluetooth low energy (BLE) antenna 1811, battery charge logic circuit 1813, battery gauge 1814, battery charge circuit 1815, power management circuit A 1816, power boost circuit 1817, microcontroller (MCU) 1812, power management circuit B 1819, power management circuit C 1818, thermal/EMI/RFI shield connection 1824, (Qi) charging circuit 1822, LED buffers 1820, external programming buffers 1821, and connections 1823.

Similarly, FIG. 18B shows a main PCB back 1802 in an example embodiment of the invention. Main PCB back 1802 includes a boost inductor 1831, a battery connection 1833, a vibration sensor 1832, and a ground plane 1834.

User Control

A user interacts with the color changers either through app control selections, as described above, with regard to FIGS. 6-11, standalone controller selections, or hardware button presses, such as described above with regard to reference numeral 1681 in FIG. 16.

Additionally, FIG. 19 shows in general how the user controls the color changers in an example embodiment of the invention. A user provides human input to the system in block 1901 and interacts with the smart device or standalone controller in block 1902. The user ultimately controls the color changers in block 1904 by using a camera function (CF), a persistence-of-vision (POV) function, or another function at the output of block 1902. If the camera function is selected, a color capture sample from a camera is taken in block 1907. The color capture sample in block 1907, in this case, is taken from an object 1909 such as a flower, bird, carpet, or other object. Likewise, the capture sample, in another case, is taken from another picture 1910, and saved on the device or screen captured from the device. The color capture sample, in a further case, is taken from any sample of the user's clothing 1908 or from another input (not shown separately). Once a color sample is captured in block 1907, the color is then set on the color changer for the selected area in block 1911. In one example embodiment of the invention, the selected areas are the LED ring, pixel, or fiber optic fabric. The selected area function generates a Bluetooth wireless data packet in block 1903, which is sent to the color changers in block 1904. In another embodiment of the controller, the manner in which a color is detected and captured in block 1907 is through the use of an analog or digital color sensor, rather than a camera.

Similarly, when a persistence-of-vision function (POV) is selected in block 1902, the user provides human input in block 1912 such as drawing or importing a picture in block 1913, which is then processed for display in block 1914. During processing in block 1914, the correct pixels are set on the LED strips (see reference numeral 1643 in FIG. 16). The processing and setting functions generate a Bluetooth wireless data packet in block 1903, which is sent to the color changers in block 1904.

In providing human input in block 1901, the user can also use the hardware button (reference numeral 1681 in FIG. 16) in block 1905 to change the modes on the color changers without the use of a smart device or standalone controller. The hardware button changes the mode and color information and is sent to the color changer in block 1904. The color changer uses the camera function, POV function, or the hardware input to display the correct color, the mode, POV image, and/or other function in block 1906.

The user 1901, can select patterns, effects, text, and other functions in block 1902. These patterns, effects, and text are displayed with the output methods described above. One example embodiment that includes text has fiber optic fabric to illuminate the device with a section in the front masked out with an E-ink display for the text or patterns. An example use of this embodiment of the invention is a hat that is fully illuminated with the area in the front used to display texts or patterns. Another example use of this embodiment includes other apparel, such as T-shirts that include text or patterns, such a logos. Another example of this embodiment of the invention displays cell phone notifications and text messages on an E-ink display. This embodiment of the invention is well suited for the slapstick wearable discussed above. E-ink embodiments are generally limited to gray scale or limited numbers of colors with a low refresh rate. Some E-ink embodiments display a fair amount of colors, but these are prohibitively expensive. E-ink embodiment refresh rates are increased by tweaking the refresh cycle; however, this can result in a burn in effect over time.

Wall Charger

In one example embodiment of the invention, a USB wall charger charges the color changers using a hard-wired connection. The charger uses UART communication to send and receive a customized valid charger signal, ensuring that an appropriate charger is used. This prevents damage to the color changer hardware, as well as chargers that may be inadequate, such as some computers and cell phone chargers. Other example embodiments of the invention use other methods of charger verification, such as, for example, resistor value verification, I²C, SPI, NFC, and wireless communication methods.

FIG. 20A shows the general hardware of an example embodiment of the invention with a USB charger, and FIG. 20B shows an example embodiment of the invention with a USB charger firmware flow chart for a USB charger, in accordance with the invention. As shown in FIG. 20A, the charger gets its power from an AC power source 2011. The AC power source 2011 is replaced with solar, an alternate battery, generator, or other power source in other example embodiments of the invention. The AC power 2011 is converted to 5V DC by an AC/DC power supply 2012. This 5V DC power is provided to USB connector terminal 2033 to supply power to the color changer charger circuit (reference numeral 1619 in FIG. 16), and to the onboard voltage regulator 2031. The onboard microcontroller 2032 gets power from the voltage regulator 2031 and runs the firmware (described in FIG. 20B). The firmware 2002, generates the UART data signal 2024. The UART data signal 2024 is sent to the color changer UART peripheral (reference numeral 1618 in FIG. 16), via the onboard USB connector terminal 2033. Other example embodiments of the invention use other types of data structures, such as, for example, SPI, I²C, NFC, or other wireless methods. Further, another example embodiment of the invention uses other charger verification methods as discussed above that would not require microcontroller 2032, voltage regulator 2031, or charger firmware 2002. The USB charger PCB is housed within the USB charger connector 2013. Another example embodiment of the invention uses other charging connectors 2013, such as, for example, DC barrel jacks or Molex connectors with or without NFC.

FIG. 20B shows the general flow chart of an example embodiment of the invention with USB charger firmware 2002. The firmware 2002 process starts in a power off state in block 2021. Once power is applied, the process continues and begins a loop, waiting for a data ready signal in block 2022 to arrive as UART data from block 2024 from the hardware UART (reference numeral 1618 in FIG. 16). Once the data ready signal in block 2022 is received by the firmware 2002, the firmware 2002 outputs a valid charger signal in block 2023 in the form of UART data 2024 to the hardware UART (reference numeral 1618 in FIG. 16). Once the charger valid signal is sent in block 2023, the firmware 2002 once again waits for a new data ready signal in block 2022. If at any point power is lost, the firmware 2002 transitions back into a power off state 2021. Another example embodiment of the invention uses other types of data structures 2024, such as, for example, SPI, I²C, or wireless methods.

Color Changer Shoe Hardware

One example embodiment of the invention is a shoe embodiment as shown in FIG. 21. FIG. 21 shows example locations of hardware used in accordance with the invention. Additional example embodiments of the invention are described in the "Other Embodiments" section of this document. The shoe embodiment FIG. 21 includes a pair of color changer hardware, which operate independently of each other. Different sized shoes have different lengths of LED strips 2130 (and reference numeral 1644 in FIG. 16). Different sized shoes also have different sized mAh batteries (reference numeral 1633 in FIG. 16) included in the color changer main hardware 2110. The size of the high powered LED for the fiber optic fabric 2140 depends on the optics used (not shown separately) in the embodiments of the invention. For example, a small (less power) high power LED is used when the optics absorb less light, the light dispersion medium absorbs less light along its length, or the embodiment requires less surface area.

FIG. 21 shows color change hardware locations for an example shoe embodiment of the invention. Main color changer hardware 2110 is positioned in the sole of the shoe near the heel. The main hardware 2110 is placed in this location because the shoe does not need to bend as much in this area during normal operation. The heel area of the shoe also gives a relatively flat area for the Qi receiving coil (reference number 1634 in FIG. 16). In other embodiments of the invention, the placement of the hardware can be re-positioned, especially if the Qi feature is not included. The epoxy, foam, glue, metal, or other covering material) shown as reference numeral 1701 in FIG. 17 prevents nails, rocks, or other objects that the user may step on from damaging the electronics. USB and user button hardware 2120 (also shown as reference numeral 1680 in FIG. 16) is placed facing outward, away from the user's foot, to prevent accidental button presses as the user moves around. In other embodiments of the invention, other methods of user input detection can be used that would not be as susceptible to accidental presses, such as, for example, resistive or capacitive touch, touch proximity sensors, or time lock out switches. The USB port on hardware 2120 is accessible through a small cutout in the fabric of the shoe. This cutout opening is covered by a fastened flap if desired. In another example embodiment of the invention, the cut-out opening is covered by a Velcro flap. USB and user button hardware 2120 is shown in the top of the tongue of the shoe in FIG. 21 but can also be placed on the side of the shoe upper or in other locations in other example embodiments. Some example embodiments of the invention do not include USB and user button hardware 2120 due to extreme waterproofing reasons, such as in sandals and pool inflatables, for example. In these example embodiments, a sealed user button is placed elsewhere on the device. In other example embodiments of the invention that utilize extreme waterproofing, an automated power on and off method is used rather than a user button 2120. The waterproofed devices include either a waterproof USB connector, magnetic charging connector, or rely on Qi charging. In embodiments that use a physical microphone 1690 in FIG. 16, a physical switch 1681 in FIG. 16, or a USB connector 1682 in FIG. 16, a waterproof version of these is used. The USB connector facilitates hardware debugging, and can be disabled in a production run to prevent a user from tampering with the firmware (for example FIG. 1) The PDM microphone (reference numeral 1690 in FIG. 16) is placed next to the USB and user button hardware, but on other example embodiments is hidden inside the fabric of the shoe or in another location. The cables to connect these devices to the main hardware 2110 run through a fabric wire chase or down the inside of the side of the upper portion of the shoe. LED strip ring 2130 is shown on the side of the shoe. The ring 2130 is placed around the inside of a translucent sole with the LED pixels facing outward. The ring 2130 uses LED's as a colored light source, which displays its color on the translucent sole that acts as a luminous substrate in this example. The LED strip 2130 uses a copper or aluminum backer to stay rigid, as well as for heat dissipation. The backer is attached using double sided thermal conductive tape, and the entire LED strip 2130 is placed in clear waterproof shrink wrap sealed with silicone. Some embodiments of the invention, including a jump rope, use a multi-axis flexible, serpentine style LED strip.

Furthermore, other embodiments of the invention, such as a beach ball use LEDs mounted on a rigid ring PCB. Other example embodiments use other backers, adhesives, and waterproofing methods, such as, for example, thermal pastes or glues, thermal plastics, flexible epoxies, resins or silicone rubbers to attach to LED strip 2130. In another example embodiment of the invention, LED strip 2130 is replaced with individual LEDs, for example 3 mm LEDs, to provide an improved range of motion. Fiber optic fabric 2140 is placed on the outside of the upper of the shoes, as shown in FIG. 21. The fibers are flexible and waterproof. The fibers are stitched into the outer layer of the fabric and have their outer casing lightly sanded or nicked in order to allow them to release light, or a chemical, mechanical, or other automated process is used to remove the outer casing of the fibers as well. The fibers are snaked into the sole of the shoe and are connected to high power red, green, and blue (RGB) LEDs wrapped in reflective Mylar (or other reflective methods, such as, for example, reflective films or powders). These LEDs are connected to a high-power LED driver and an aluminum heat sink or other heat dissipation material. The distance between the LED and the fiber depends on the embodiment of the invention in use and the color convergence desired. Other embodiments of the invention use lenses between the LED and fiber to get the color diffusion and convergence to appear uniform on the fiber optic fabric portion. These lenses are used in some embodiments of the invention because the individual red, blue, and green portions of the high-powered LED are converged and then redistributed evenly between the fibers in the fabric. Fiber optic fabric 2140 includes fiber optic strands as a luminous substrate, in which light falls on it from LED's acting as a colored light source transmitted through the convergence optics. In another example embodiment of the invention using the fiber optic fabric 2140, an electrically stimulated panel, similar to smart glass, light valve, or other panel, is used between a light guide (such as the fiber optic fabric) and a mylar reflector panel or other guides or reflectors to allow different amounts of light through to the user's eyes to produce colors that utilize the absence of light, such as blacks, grays, and browns. This electrically stimulated panel is controlled by the S and V values in the HSV color scale. Another example embodiment of the invention uses alternative light sources, such as lasers, filtered light, or other sources to make the fiber optic fabric more energy efficient. Furthermore, another example embodiment of the invention uses lenses and diffusion methods to make the fiber optic fabric more energy efficient. Another alternative example embodiment of the invention uses a more efficient color generation method for its luminous substrate and colored light source in place of the fiber optic fabric 2140, such as electroluminescence, bioluminescence, electrochromatics, E-ink, photonic ink (P-ink), OLED, filtered EL panels or wire, light guides, printed nano LEDs, or other color generation methods. Another example embodiment of the invention uses a touch panel to replace the fiber optic fabric 2140 to allow the user to draw on the color changer and enable the UI to be built directly into the color changer. In this example embodiment of the invention, the touch panel has a protective coating placed over it, and a small camera or color detector is placed directly into the color changer to interface with the UI touch panels. The entire LED and circuit module are waterproofed using a combination of shrink wrap, epoxy, and silicone.

Color Changer Photonic Ink General Overview

Other example embodiments of the invention include electrically variable and controllable ink-based (P-ink) color changing apparel and devices. Photonic ink embodiments of the invention are used in wearables and devices as previously described and in clothing, home décor, product casing, sports equipment, vehicle interiors, entertainment apparel, and other areas.

Photonic ink color changing, in accordance with the invention, is performed in the same fashion as outlined above using a color detection method. Color data is processed and corrected based on how humans perceive color and ambient light to make the color displayed as accurate as possible. Other example embodiments of the invention use graphical based changes to display images and text. Video capable embodiments are produced using high refresh rates of photonic ink. At video speeds, photonic ink is used in the same fashion as billboards, computer screens, tablet screens, E-readers, phone screens, and other displays. One advantage of the photonic ink display screens, in accordance with the invention, is that they do not get washed out in sunlight and are easier on a user's eyes, as they use reflective light technology rather than light emitting technology. In dark situations, an optional front light guide can be used as well.

Current phones, computers, and billboards that use LCD, OLED, or LED screens are often washed out by sunlight. Some E-readers use reflective e-ink technology but are limited to black and white, tri-colors, or a limited amount of RGB combinations whereas photonic ink can produce the same amount of colors as expected in the screen industry. Current photonic ink devices do not have high enough switching speeds to show video. In the past, some companies have used electroluminescence to create single color painted light up sections for vehicles and fabrics, while other companies have used magnetic infused paint to create vehicles that could switch between a few colors. These vehicles have issues with the colors appearing differently depending on the angle in which the user is viewing the object.

The photonic ink embodiments in accordance with the invention use reflective materials along with electrically controllable crystal structures that adjust to change the wavelength of light (color) reflected back to the user. The photonic ink embodiments in accordance with the invention provide an alternative medium to the light emitting optics discussed above. Photonic ink is a bi-stable color reflecting luminous substrate, which means it holds its color even after electricity is removed. This feature translates into low power consumption for the devices. The output/display portion of the example embodiments of the invention using photonic ink use between a few nano-amps and a few micro amps to function. This low current design allows for smaller batteries and provides longer battery life. The integrated circuits, including the microcontroller, are placed into a low power state to conserve battery life. Due to photonic ink's reflective nature, sunlight will not wash out its coloring. In low light situations, an optional front light guide or other light transferring medium can be used instead of an ambient light source. The example embodiments of the invention using photonic ink vary their color by varying the input voltage. The input voltage is controlled using a digital to analog converter (DAC) with a high resolution or other analog control devices. Example embodiments of the invention using photonic ink use conductive films on both sides for their positive and negative terminals. In some example embodiments of the invention using photonic ink, the conductive film is indium tin oxide (ITO) coated onto a flexible polyethylene terephthalate (PET) backer. Other example embodiments of the invention using photonic ink use copper (Cu) films, silver (Ag) films, carbon nanotube films, carbon graphene films, and other conductive films coated onto other backers substituting PET.

Photonic Ink System Hardware Control

FIG. 23 is a flow chart of an example embodiment of the invention using photonic ink hardware and shows how a user generates different output colors. The user provides human input in block 2310 via the User Interface Device 2312. The User Interface Device 2312 can be a smart device, such as a phone or tablet, a standalone controller, or another user interface. The photonic ink Bluetooth Hardware 2314 receives the user commands in the form of wireless Bluetooth packets 2313 from the User Interface Device 2312. The Bluetooth Hardware 2314 is similar to the microcontroller (see reference numeral 1608 in FIG. 16) as described above. Photonic ink has its reflected output color 2311 controlled by voltage. To control voltage digitally, a digital to analog converter (DAC) 2315, or other analog control circuitry is used by the Bluetooth hardware 2314. Since the photonic ink 2317 and 2318 are bi-stable, they do not need to have constant voltage applied to it to hold its color. This bi-stable feature makes it possible to use a high ratio analog mux 2316 to control multiple photonic ink segments 2317 and 2318 with a single output DAC 2315. For example, if there are 32 photonic dots 2318 and no photonic ink panels 2317, a 32:1 analog mux 2316, or other multi-output analog control circuitry, is used. In another example embodiment of the invention with four photonic ink panels 2317 and 32 photonic ink dots 2318, a 36:1 analog mux 2316 or other multi-output analog control circuitry is used. Photonic ink 2317 and 2318 use ambient light, light from a front light guide, or other illumination sources 2319 to generate their reflected output color 2311. When a front light guide or other illumination source is used 2319, the Bluetooth hardware 2314 controls its output and produces the appropriate color correction. Photonic ink 2317 and 2318 work by taking full color spectrum light (white light) 2319 and reflecting a single output color 2311 based on the amount of voltage supplied. As the voltage varies in the photonic ink 2317 and 2318, the crystal structure in the ink stretches or shrinks to change the wavelength of light reflected 2311.

Photonic Ink Stack Up

FIGS. 24A and 24B show stack-ups of PCB layers to make a photonic ink panel or dot, as well as how a dot strip is created. FIG. 24A shows a stack up of layers 2410 to make a photonic ink panel. Polyethylene terephthalate (PET) plastic film backers 2411 and 2413 are coated with an indium tin oxide (ITO) conductive substrate film. Other example embodiments of the invention using photonic ink use copper (Cu) films, silver (Ag) films, carbon nanotube films, carbon graphene films, and other conductive films coated onto other backers substituting PET. Sandwiched between plastic films 2411, 2413 is a photonic ink coating 2412. An optional front light guide film 2417 can be used in low light conditions and is placed on top of or combined with plastic film 2411. The light guide film 2417 uses LEDs 2418 as its light supply. Other example embodiments of the invention use other light guides and illumination methods, such as those that incorporate microdots pressed or printed into imaged areas that are to be illuminated. Cutouts can be made in the edge of the light guide to place side emitting LEDs. Light rays from the (side emitting) LEDs travel through the film and are refracted from the microdots upward toward the surface of the overlay to produce a uniform backlighting effect. In another example embodiment of the invention, an additional layer, in the form of a light valve or other light controlling film, is included above or below 2417 to produce colors that require degrees of absence of light, such as black, for example. This light controlling layer is used in embodiments based on the chemistry used to produce the photonic ink. Some chemistries of photonic ink can produce colors that require degrees of absence of light on their own. Some of these chemistries produce the color black by applying a voltage that stretches the crystalline structure of the photonic ink, so that its wavelength variable reflective edge normally used for color generation is parallel to the incoming light. Instead of reflecting a specified wavelength back, this method causes the surface to not reflect any light displaying black on the surface. A protective PET film layer 2416 is placed on top of the light guide 2417 to protect the stack up from outside elements. Other embodiments of the invention use other protective films instead of PET for layer 2416. Copper foil 2414 is connected to plastic film 2411 to supply a ground connection. Another piece of copper foil 2415 is connected to plastic film 2413 to supply a positive connection supplied by the DAC (reference numeral 2315 in FIG. 23), via the analog mux (reference numeral 2316 in FIG. 23). Other example embodiments of the invention use other conductive methods, such as conductive glue or other conductors for a positive/ground connection 2415/2414.

FIG. 24B shows an example photonic ink pixel stack up 2420 in accordance with the invention. Photonic ink pixel stack-up 2420 shows how multiple photonic ink stack ups 2410 (in FIG. 24A) are used to create a pixel strip made out of photonic ink dots 2421 (also reference numeral 2318 in FIG. 23). Copper foil for common ground connection 2422 is copper foil that creates a common ground connection between all photonic ink dots 2421. Copper foil for separate positive connections 2423 is copper foil used to create separate positive connections to the photonic ink dots 2421. Separate positive connections are used to make each dot capable of displaying a separate color. The separate positive connections 2423 are connected to the DAC (reference numeral 2315 in FIG. 23), via the analog mux 2316 (in FIG. 23). As discussed above, in other example embodiments of the invention, other conductive methods, such as conductive glue or other conductors for a positive/ground connection, can be used to replace copper foil 2423/2422.

Photonic Ink Shoe Hardware Embodiment

FIG. 25 shows an example shoe embodiment of the invention using photonic ink. Photonic ink hardware 2531 (also reference numeral 2314 in FIG. 23, for example) is shown in a heel location similar to BLE hardware 2110 shown in FIG. 21 used for other output methods discussed above. FIG. 25 also shows an example tongue location of a user button 2532, which is one example user interface device (see reference numeral 2312 in FIG. 23, for example). Other example hardware user interfaces 2532 can also be used (see reference numeral 2120 in FIG. 21, for example). FIG. 25 also shows an example location of a ring of photonic ink pixels 2533, corresponding to photonic ink pixel stack-up 2420 in FIG. 24 and photonic ink dots 2318 in FIG. 23. FIG. 25 also shows one example location of photonic ink panels 2534, which corresponds to photonic ink main stack up 2410 in FIG. 24 and photonic ink panel 2317 in FIG. 23. In the example embodiment of the invention, shown in FIG. 25, the photonic ink panels 2534 are fabric-like and cover the entire shoe, allowing a user to control the color of the entire shoe as described above. Similarly, in other example embodiments of the invention, the entire object (e.g., shoes, t-shirts, hats, etc.) are wrapped in photonic ink panels 2534 to allow a user to control the color of the entire object as described above.

Photonic Ink Example Firmware

The firmware used in the example photonic ink embodiments of the invention works similarly to that of the firmware previously discussed with regard to color changing LED strips and rings (for example, as shown in FIG. 21 and described in FIG. 1). In example photonic ink embodiments, the output section of the firmware, instead of controlling LEDs, converts the RGB color into appropriate wavelengths of color that are reflected back to the user. The wavelengths are then converted into voltages for the digital to analog converter (DAC 2315 in FIG. 23) to output. High resolution digital to analog converters ensure sufficient color slices. If a low-resolution DAC is used, few colors can be represented. For example, 8 bits would give 256 voltage increments where 16 bits would give 65,536 voltage increments. Because of the low voltage used, and the amount of voltage difference to show a different color, ⅓ to ½ the number of colors are displayed compared to the number of voltage increments. Most computer or smart device screens are capable of displaying over 16 million colors. In order to get a rough representation of the colors shown on a computer or smart device screen, a high-resolution DAC is needed to achieve sufficient color slices, where a slice is a single color being output. Firmware and software apps, as described above, control the analog to digital converter, control the analog mux, and perform color correction. In other example embodiments of the invention, firmware and software apps, as described above, control other analog output methods.

Standalone Controller

A standalone controller can be used in place of a smart device to access features of the color changers. In one example embodiment of the invention, a standalone controller is similar in size to a smart phone, allowing the user to easily bring it along with them wherever they go. Another example embodiment of the invention includes a standalone controller of different sizes depending on the components used and the target age group. For example, younger and older users may benefit from controllers that are larger than those used by some users. One example embodiment of the invention includes a standalone controller wrapped in rugged rubber-like material to protect it against drops. This feature is especially useful when the user is a younger child.

FIG. 22 shows an example standalone controller signal flow, showing how hardware components interact with each other. Microcontroller 2201 controls portions of the signal flow. One example microcontroller 2201 is a NRF52832 processor. Microcontrollers 2201, such as the NRF52832, are chosen because of their low energy, multi-mode BLE SoC (Bluetooth Low Energy System-on-a-Chip) configurations. These microcontrollers 2201 have multiple hardware peripherals incorporated on the same integrated circuit. In other example embodiments of the invention, other similar integrated circuits are used as well. Other example embodiments of the invention use Bluetooth Classic instead of BLE in the same fashion described above (see reference numeral 1608 in FIG. 16, for example). The features and capabilities of the hardware peripherals and integrated circuits can be balanced against decreased battery life. Further, in other example embodiments of the invention, FCC certification is facilitated by using pre-certified drop-in modules (see reference numeral 1608 in FIG. 16, for example). Multi-mode BLE SoCs allow the chips to act as both a central and peripheral device. Other types of microcontrollers discussed above can be used as well.

Resistive or capacitive touch interface 2202 of a standalone controller receives human input 2217 to select options for controlling the color changer hardware. LCD screen or paper underlay 2204 is used in conjunction with the interface 2202 to present the user with options to select. In other example embodiments of the invention, a standalone controller uses other display and selection methods (such as membrane switches, for example) to select options for controlling the color changer hardware. Camera or color detection chip 2203 is used in the color detection mode. A color detection chip 2203 can be used at a low cost, as it does not require a live camera preview or hardware for processing such a preview. An example embodiment of the invention uses a standalone controller that includes an SD card (or other memory card) to allow the user to take pictures when a camera is used for the color detection 2203. The touch interface 2202, underlay 2204, and detector 2203 provide inputs and receive outputs to/from microcontroller 2201. Camera or color detection chip 2203, as well as touch interface 2202 in conjunction with underlay 2204, provide color change selectors for the standalone controller to send software instructions to the electronic control circuit in the article or device.

In FIG. 22, LiPo battery 2205 can be a 3.7V or 7.4V source, depending on the embodiment of the invention in which it is used. In one example embodiment of the invention, a lithium polymer battery 2205 provides a mAh capacity determined by the configuration of the hardware included in the controller. In another example embodiment of the invention, other battery chemistry, voltages, capacities, and configurations can be used. The battery 2205 is charged, via a dedicated LiPo integrated circuit charger 2206, which protects the battery 2205 from overcharge, over voltage, over discharge, under voltage, and controls the charging process. Another example embodiment of the invention uses other dedicated integrated circuits to match the battery chemistry used. Further, another example embodiment of the invention uses discrete components rather than a dedicated integrated circuit to charge the battery. The Qi charging circuit 2208 gives power to the LiPo charger 2206 and the power management logic 2209 when it is enabled. The Qi charging circuit 2208 receives wireless Qi charging signals from the Qi charger (not separately shown). Another example embodiment of the invention uses other wireless charging standards and designs, such as, for example proprietary or non-Qi inductive charging for wireless charging.

The user can also supply power to the LiPo charger 2206 and to the power management logic 2209 during charging from a USB power adapter, via the mini USB port 2213. Other example embodiments of the invention use other styles of USB connectors and other connection methods for connector 2213. Charging functions are controlled through the microcontroller 2201, via power management logic 2209 via charging logic 2207. Charging logic 2207 sets the current limit for battery charging, switching between charging sources, and disabling charging if the battery 2205 overheats. Other example embodiments of the invention that do not have Qi charging can reduce the component count in the charging logic 2207 by setting a fixed current limit for battery charging and a fixed charging source. The battery 2205 has its state of charge monitored by the LiPo fuel gauge 2210, which is read by the microcontroller 2201, via I²C/TWI. Another example embodiment uses other fuel gauges or other methods of battery level metering, such as, for example, Coulomb counting, voltage vs capacity curve methods, or load vs. rest sensing methods. These other example embodiments use other communication protocols, such as, for example, SPI, serial, parallel, or analog to communicate with the fuel gauges.

The Serial Wire Debug (SWD) port 2211 of the microcontroller 2201 is used for uploading firmware to the microcontroller 2201. The SWD port 2211 is used during initial factory programming or during debugging. During factory programming, the SWD 2211 is connected directly to the SWD programmer, via a PCB programming header (not shown separately). Another example embodiment of the invention uses other programming methods, such as, for example, UART, ISP/ICSP/ICP, or Over-Air programming depending on the type of IC used 2201. USB data port 2212 is a dedicated USB hardware controller or can be internal to the microcontroller 2201 functionally, through software or through an upgrade to the microcontroller 2201 (e.g., NRF52840) integrated circuit. In other example embodiments of the invention, other types of microcontrollers with USB controllers are used for 2201. The USB data port 2212 is used for firmware updates using a computer, via the USB connector 2213. This method is also used to update the color changer firmware through the standalone controller in some example embodiments of the invention. In other example embodiments of the invention, a smart device, connected to the standalone controller, via Bluetooth for example, performs this firmware update.

The PCB based Bluetooth antenna 2214 is connected to the microcontroller 2201 and receives and transmits wireless Bluetooth data packets 2215. The Bluetooth data packets 2215 are sent and received from the Color Changer Hardware and BLE Stack 2216 in response to user input 2217 via the touch interface 2202. To save cost, the Bluetooth antenna 2214 is etched on the PCB, but in other embodiments, the PCB antenna is replaced by other types of antennae. Other example embodiments of the invention include standalone controllers that use other communication methods to match the methods used in the color changer hardware. Further, other example embodiments of the invention use different hardware designs depending on manufacturing feature and cost requirements. One example embodiment of the invention uses a PCB design that is modular to allow the manufacturer to include only the features they wish based on cost requirements. Another example embodiment of the invention uses IR communication to transmit basic color and effects selection to decrease cost. Other example embodiments of the standalone controller act as an intermediate device to facilitate communication with the color changer hardware using a computer or similar device as the UI interface.

Other Example Embodiments

An example shoe embodiment of the invention is shown in FIG. 21. However, there are many other example embodiments of the invention that use similar software and hardware components. These embodiments include, for example, shoes, skate shoes, sandals, fiber optic cloth shoes, fiber optic cloth baseball caps, fiber optic cloth gym bags, jump ropes, pool inflatable inner tubes, beach balls, wrist slapsticks, dog collars, dog leashes, skateboards, whip n'skip (whip it), bike tires, persistence-of-vision bike tires, and Christmas tree lights. In an example embodiment of the invention, a slapstick, a flexible light guide, highly reflective mylar, and other optical methods can be used for improved optical dispersion. In an example embodiment of the invention, a bike tire uses a generator attached to the wheel to power the color changer and to charge it while a user is pedaling. Other embodiments include, for example, multiple types of wearable objects and clothing, house decorations, furniture coatings or fabrics, vehicle stylizations, outdoor objects, and novelty/gift items. Some of the wearables include, for example, T-shirts, jeans, women's formal shoes, and other fabric-based clothing/wearables, hoodies, bow ties, suit jackets, vests, neck ties, scarfs, purses/handbags, and dresses. Objects of clothing embodiments also have light up sections, which are in the shapes of logos, images, or words (e.g., similar to embroidery) using fiber optic thread. Boots, skates, shoelaces, and Halloween face masks are other example wearable embodiments of the invention. Other example embodiments of the invention include house decorations, furniture coatings and/or fabrics, vehicle stylization, outdoor objects, and novelty/gift items. Some novelty gift item embodiments include, for example, hula hoops, Frisbees, golf balls, plastic ice cubes, and serving trays. Some example embodiments of household decorations include curtains, bed sheets, pillow casings, carpets, and other furniture fabrics. Other example embodiments of the invention include colored tablecloths and chair covers for banquets and other dining events. Other example embodiments in the sports industry include sports jerseys, fan memorabilia, ski boots, skis, snowboards, golf shoes, snow tubes, golf clubs, baseball bats, tennis rackets, bowling pins, and other sporting equipment. The systems and methods of the invention are used in the entertainment industry, as well, with example embodiments including headbands, wrist bands, neck bands, spinners, light up sticks, light up fingers, light up shirts with entertainment logos, and light up fan memorabilia. Other entertainment industry embodiments include, for example, costumes and set designs. Fan memorabilia can include, for example, links to lighting consoles to interact with a show in real time. In order to link to the lighting console, different communications methods can be utilized, including mesh, wireless DMX, 2.4 GHz, ant, or Wi-Fi, for example. An example embodiment of the invention that uses Wi-Fi in the consumer industry hosts a control web page similar to a router or GoPro. In this example embodiment of the invention, the user uses any Wi-Fi capable device with a web browser to act as the UI device to control the color changers. These embodiments use a different SoC to provide Wi-Fi communication and hosting. The real time color detection portion of the app is used in other example embodiments where real time color detection is beneficial, such as, for example, accessibility assistance applications (color blind assistance, for example) or paint or theatre palette assistance (for example, graphic art color detection and gel color detection). Other example embodiments of the invention include, creative safety equipment devices, such as runner bands or socks, running shoes, bike tags, and vests, for example.

Other Example Photonic Ink Embodiments

An example photonic ink shoe embodiment is shown in FIG. 25. However, as outlined above with regard to the color changer LED control fiber optic fabric, (e.g., as shown in FIG. 21), there are many other example photonic ink embodiments of the invention that use similar software and hardware components. In addition to the example embodiments of the invention above, example photonic ink embodiments include paint to paint walls, as well as pictures. Photonic ink can be used as a pigment in device cases, such as phones, computer cases, and outer shells to house other consumer electronics, allowing the user to select whatever color desired. Digital picture frames and digital billboards that do not emit light are other example photonic ink embodiments of the invention. A paintable grid, matrix (similar to that of a TFT (thin film transistor) display, for example), or other similar substrate can be used on walls to display photos without directly hanging them. In these examples, the user dynamically moves these photos around their house with the touch of a button. That is, if a user coats their entire wall with photonic ink, it essentially turns their wall into a non-light emitting screen. Instead of hanging physical photos, they can use their UI device to place photos where they would like and dynamically move them around their walls, as well as dynamically change the color of their walls.

In this example embodiment or that of solid paint coatings, a substrate that is not affected by a structural break, for example nails, is used to paint on the wall. Because of the stack-up, even in a sprayed form, if a user puts a conductive item, such as a nail, through the entire stack-up, it would be shorting the negative and positive layers of the pixels in that area. Because of the matrix design, a "self-healing/insulating" material or electrical circuit could be used to prevent this short form propagating down that entire row or column. Alternatively, a surface mount hanging device could be used that does not penetrate the matrix.

This substrate, as well as the photonic ink, is placed in a binder to be easily spread, sprayed, or applied in a fashion similar to common house paint. Examples of these substrates include Lumilor substrates (or other similar conductive luminescent substrates or sprays) used for EL (electroluminescence) coatings, or other light emitting coating systems. With increased refresh rates, photonic ink example embodiments are used to replace video walls and to replace LCD screens in devices, such as TVs, cell phones, and computers. Using photonic ink in accordance with the invention to replace these displays eliminates blue light that is commonly associated with eye strain and creates a screen that is not washed out by sunlight. Using photonic ink in these devices greatly reduces power consumption and extends battery life as well. Another embodiment of the invention using photonic ink allows a user's cell phone screen to be displayed and shown on their clothing or other apparel or device, similar to casting a cell phone screen or media (e.g., slide shows, digital photographs, and other displayable media files) to a TV. Other examples of personal displays using photonic ink include showing a user's phone notifications, such as incoming phone calls and texts, and displaying the messages as indicators on the color changer devices.

The invention is described in terms of example hardware and software embodiments. The summarized and detailed descriptions of both the hardware and the software are not intended to limit the scope of the invention. The invention is used as a whole or in part for many other types of consumer and industrial devices as well.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention uses a smart device or standalone controller to change colors and patterns on users' apparel, devices, and accessories, via camera or sensor color detection, and built in menus for effects and audio sources. The invention provides a customized style, color, and pattern to the apparel. The invention includes shoes with LED rings around the soles and/or LED fiber optic fabric. The invention also includes photonic ink as a color medium, as well as E-ink (electronic ink) to display text and patterns. Combinations of photonic ink can be used to create pixels or matrices. The invention is used in other types of wearables, devices, hard goods, and other fields including clothing, home décor, product casing, sports equipment, vehicle interiors, entertainment apparel (e.g., slapsticks and head bands), and other fields.

I claim:

1. A system for changing the color of an article with a smart device, the system comprising:
   a color changing application, including instructions stored on a non-transitory computer-readable medium executed by a processor including:
      receiving an executable command from a color change selector at an electronic control circuit integrated within the article;
      generating a control signal to a digital LED integrated within the article based upon receipt of the executable command from the color change selector;
      generating a color output from the digital LED integrated within the article to illuminate a first portion of the article;
      receiving a colored light signal from the digital LED with a current decoder and decoding the colored light signal to provide an individual LED color signal;
      receiving the individual LED color signal with an analog LED that generates colored light; and
      generating a visual output from the colored light of the analog LED to a luminous substrate integrated within the article to illuminate a second portion of the article.

2. The system of claim 1, wherein the type of article includes a wearable article.

3. The system of claim 1, wherein the type of article includes a hard good.

4. The system of claim 1, wherein sending executable commands from the color change selector to the electronic control circuit of the article is performed using a wireless communication connection and wherein the instructions further comprise:
   transmitting a communication connection request from the smart device; and
   connecting the smart device to the electronic control circuit of the article when the communication connection request is granted by the electronic control circuit of the article, and
   wherein the communication connection between the smart device and the electronic control circuit includes a Bluetooth handler process with instructions comprising:
      identifying previously configured color change selectors,
      checking for an active status of the color change selector,
      creating a Bluetooth thread, and
      pushing an updated Bluetooth connection to the electronic control circuit such that the communication connection runs in the background as a service and is maintained when the color changing application is closed or when a user changes to another application.

5. The system of claim 1, wherein the executable commands sent to the electronic control circuit of the article include settings tab commands to effect at least one of the following actions:
   transferring Bluetooth wireless communication protocol settings from the smart device to the electronic control circuit; and copying updated firmware from the smart device to the electronic control circuit.

6. The system of claim 1, wherein the executable commands sent to the electronic control unit include at least one of the group of
a selected color and a visual output effect, and
wherein the executable commands include an output effect setting command that is saved in the article for execution by the electronic control circuit of the article to maintain the color sequence for display on the article when the color changing application is closed or disconnected or when a user changes to another application.

7. The system of claim 1, wherein the smart device includes a color change selector that includes a software control in a user interface of the smart device in the background as a service that holds a last data transmission, including when the color changing application is closed or when a user changes to another application, wherein the software control
receives a user input, including a hardware device selection, a color selection, and a speed of effect selection, processes that user input, and
sends an executable command to the electronic control circuit in the color change hardware in the article to provide a control signal to the digital LED to generate the visual output.

8. The system of claim 1, wherein the smart device includes the color change selector, and wherein the smart device includes a camera that automatically detects and provides a selected color as a video input signal in the smart device that is processed and is sent as an executable command to the electronic control circuit in the color change article to provide a control signal to the digital LED to generate the individual LED color signal to the analog LED based on the color automatically detected by the camera.

9. The system of claim 8, wherein user selected pixel information from the video input signal in the smart device is converted into corrected color data based on how humans perceive color.

10. The system of claim 7, wherein the color change selector on the smart device includes a software control in a user interface of the smart device that
receives a user input, including the hardware device selection, and
wherein the hardware device selection individually
controls the visual output to a selected subset of hardware devices in the article,
processes that user input, and
sends the executable command to the electronic control circuit in the color change hardware integrated in the article to provide a control signal to the digital LED to individually control the visual output to a selected subset of portions of the article.

11. A color changing article comprising:
a digital LED integrated within the article that receives a control signal including an executable command from a color change selector and generates a color output to a luminous substrate integrated within the article to illuminate a first portion of the article;
a current decoder that receives a colored light signal from the digital LED and decodes the colored light signal to provide an individual LED color signal;
an analog LED that receives the individual LED color signal and generates colored light;
a luminous substrate integrated within the article and including fiber optic strands for receiving colored light from the analog LED and to generate and display a visual output to illuminate a portion of the article, wherein the luminous substrate includes a nicked casing that breaks internal reflection in the luminous substrate and allows light to escape;
a convergence lens positioned between the analog LED and the fiber optic strands to combine and diffuse the generated colored light for a uniform appearance on the fiber optic strands;
an ambient light sensor; and
a processor in an electronic control circuit integrated within the article
for generating the colored light control signal to the digital LED integrated within the article upon receipt of an executable command from a color change selector of a smart device and
for generating a correction signal for calibrating the colored output generated by the digital LED and the colored light from the analog LED based on how humans perceive color, and
for generating an ambient light correction signal based on an ambient light value from the ambient light sensor, wherein the ambient light correction signal calibrates brightness of the digital LED and the analog LED.

12. The article of claim 11, wherein the article includes the color change selector for creating the executable command for generating a control signal for the digital LED integrated within the article to generate and display the visual output,
wherein the color change selector comprises an input sensor,
wherein the input sensor is at least one of the group of
a color detector for providing a video signal,
a microphone for providing an audio signal,
a vibration sensor for providing a vibration signal,
a Hall effect sensor for providing a rotation signal, and
an accelerometer for providing a force of acceleration signal.

13. The article of claim 11, further comprising at least one of the group of
a wireless Qi charger,
a non-Qi inductive charger,
a mini USB charger port,
a micro USB charger port,
a USB C charger port, and
a magnetic charger port.

14. The article of claim 11, wherein the luminous substrate integrated within the article includes a light emitting medium.

15. An article of claim 14, wherein the luminous substrate integrated within the article includes at least one of the group of
a fiber optic fabric,
a fiber optic ring,
an LED pixel ring, and
a light guide material.

16. The article of claim 14, wherein the colored light signal from the digital LED is sent to a high current driver decoder that converts the signal to an analog signal to be used by the analog LED.

17. The article of claim 11, wherein the smart device is a standalone controller.

18. The article of claim 11, wherein the processor receives at least one of the group of
a rotation count and time and wherein the processor determines an amount of time one-degree section/slice of the generated visual output remains on to display an image created by a persistence of vision effect, and
a control signal command, wherein the processor implements a color change based on the control signal command to provide at least one of the group of a mood effect, an audio effect, a step effect, and a color change effect.

* * * * *